US006864998B2

(12) United States Patent
Kito et al.

(10) Patent No.: US 6,864,998 B2
(45) Date of Patent: Mar. 8, 2005

(54) IMAGE READING APPARATUS, IMAGE RECORDING MEDIUM AND IMAGE FORMING APPARATUS

(75) Inventors: Eiichi Kito, Kanagawa (JP); Yoshiharu Okino, Kanagawa (JP); Yoshinori Morimoto, Kanagawa (JP); Tomonori Nishio, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 599 days.

(21) Appl. No.: 09/725,805

(22) Filed: Nov. 30, 2000

(65) Prior Publication Data

US 2001/0046070 A1 Nov. 29, 2001

(30) Foreign Application Priority Data

Nov. 30, 1999 (JP) .......................................... 11-340861
Nov. 30, 1999 (JP) .......................................... 11-340871

(51) Int. Cl.[7] ............................................... H04N 1/40
(52) U.S. Cl. ....................... 358/471; 358/474; 358/475; 358/487; 358/505
(58) Field of Search ................................. 358/506, 509, 358/500, 505, 515, 497, 474, 486, 494, 471, 475; 348/96, 97; 382/167

(56) References Cited

U.S. PATENT DOCUMENTS

| 5,122,645 | A | * | 6/1992 | Saeki et al. ................. 235/375 |
| 5,465,155 | A | * | 11/1995 | Edgar ......................... 358/500 |
| 5,519,510 | A | | 5/1996 | Edgar ......................... 358/471 |
| 5,790,277 | A | * | 8/1998 | Edgar ......................... 358/487 |
| 5,988,896 | A | * | 11/1999 | Edgar ......................... 396/604 |
| 6,215,564 | B1 | * | 4/2001 | Okino ......................... 358/501 |
| 6,580,528 | B1 | * | 6/2003 | Imoto et al. ................ 358/497 |

FOREIGN PATENT DOCUMENTS

| EP | 0 610 994 A2 | 8/1994 | ............ G03C/7/30 |
| JP | 6-295035 | 10/1994 | ............ G03C/7/00 |

* cited by examiner

Primary Examiner—Edward Coles
Assistant Examiner—Heather D. Gibbs
(74) Attorney, Agent, or Firm—Sughrue Mion, PLLC

(57) ABSTRACT

In order to provide an image reading apparatus, which can read images on a monochromatically developed color photographic film, it is provided a reading conditions changing portion, which changes reading conditions of sensors on the basis of information applied to the color photosensitive material, or is provided light sources which irradiate light, having at least one of wavelength and light quantity being different from that of the other, at an emulsion surface side and a support surface side of the color photosensitive material, respectively.

21 Claims, 21 Drawing Sheets

F I G. 1 0
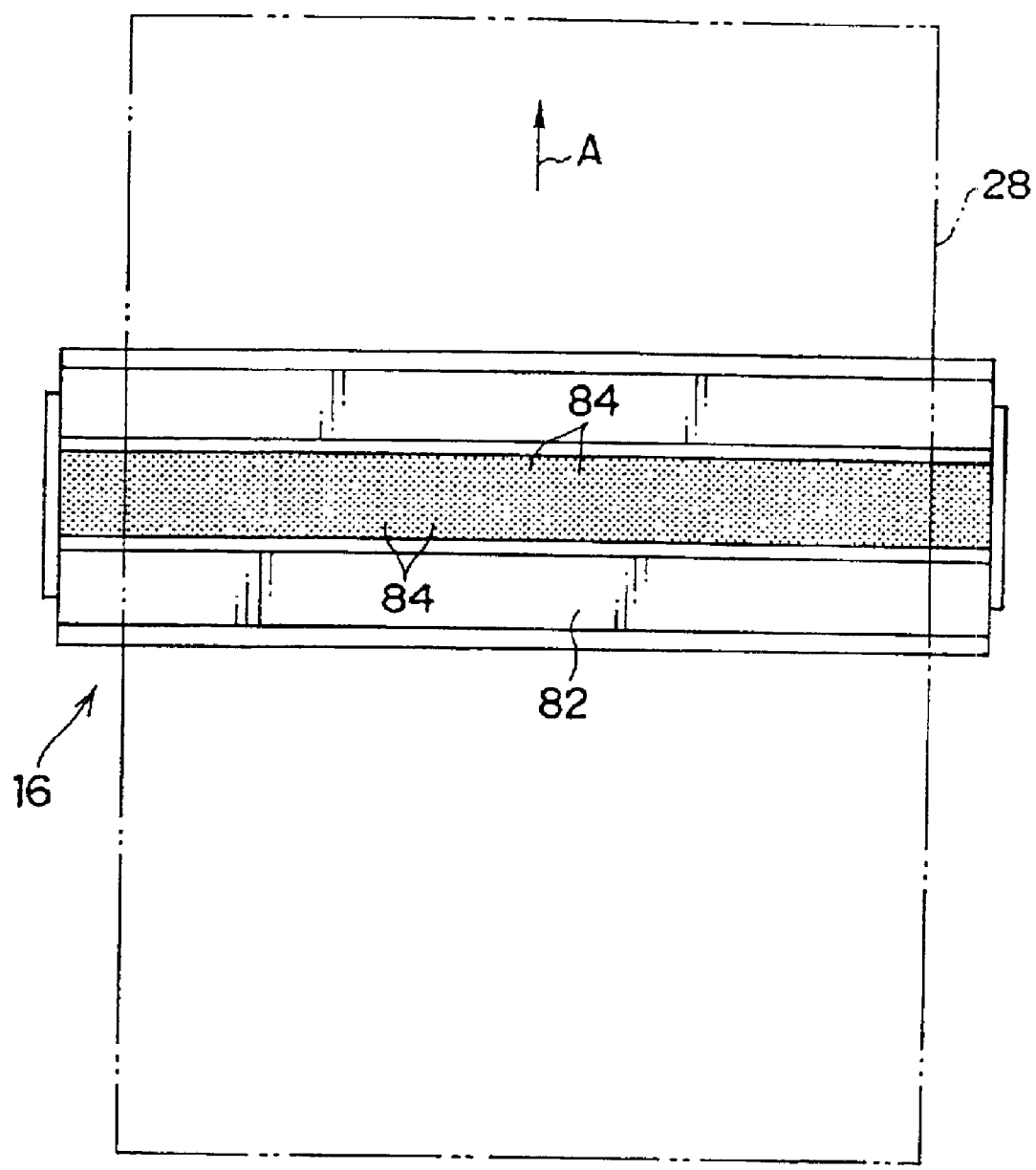

F I G. 1 2 A
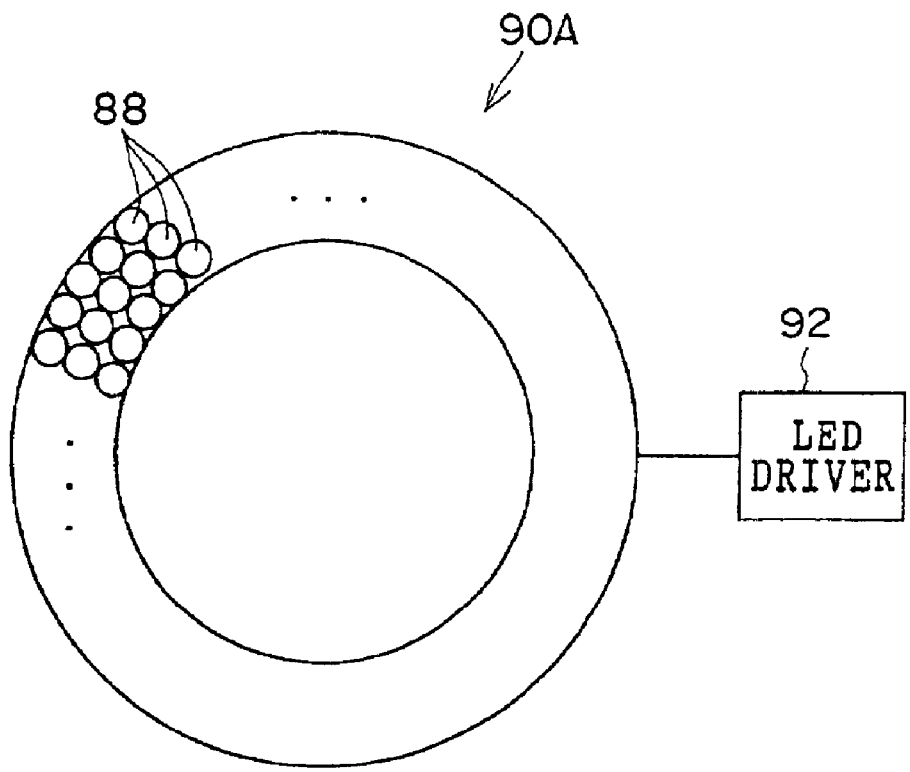
F I G. 1 2 B
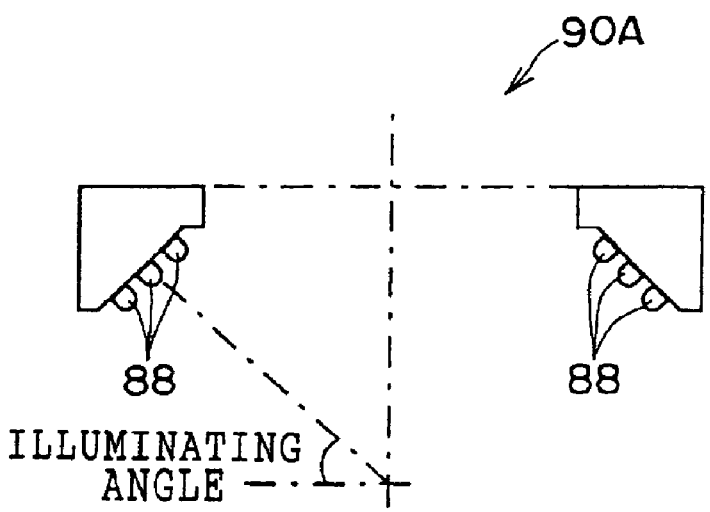

F I G. 1 3
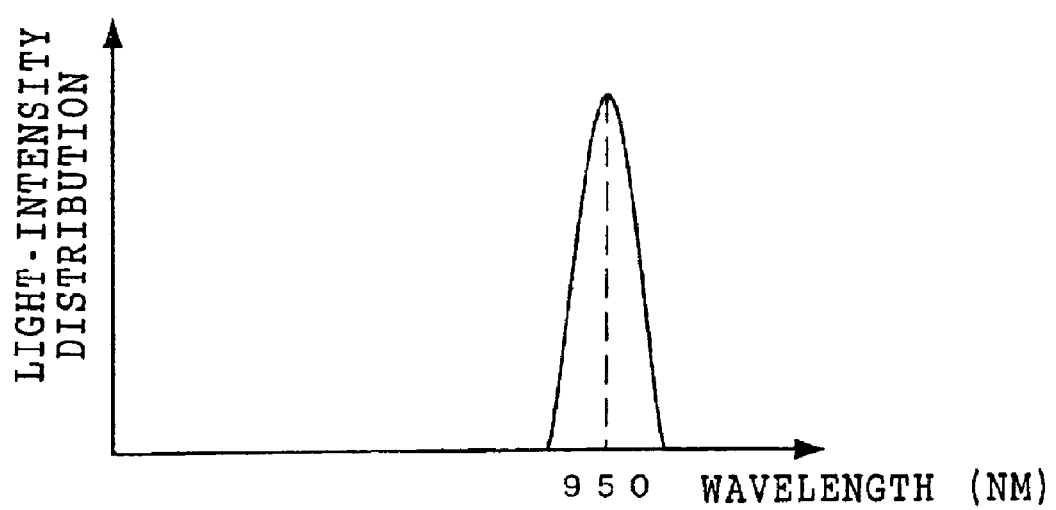

F I G. 1 6
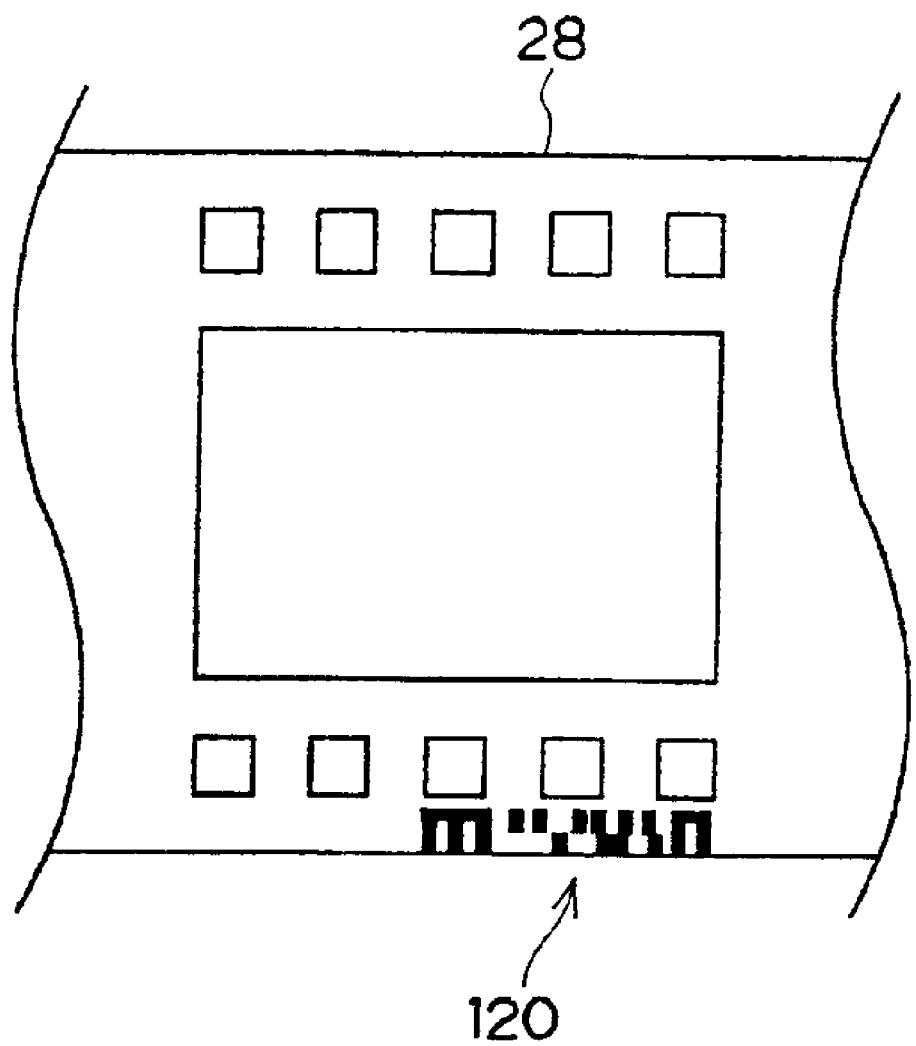

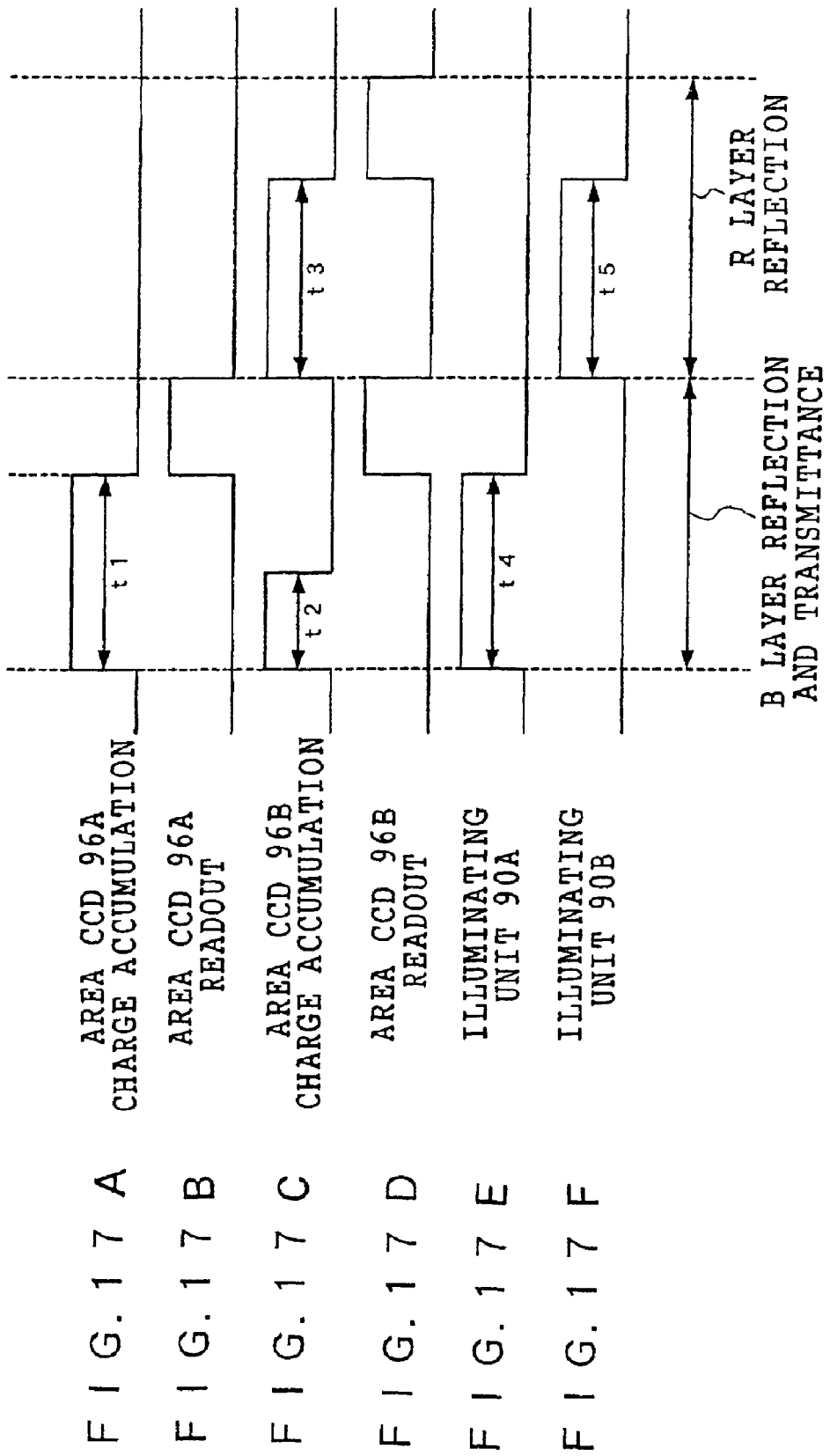

F I G. 1 8
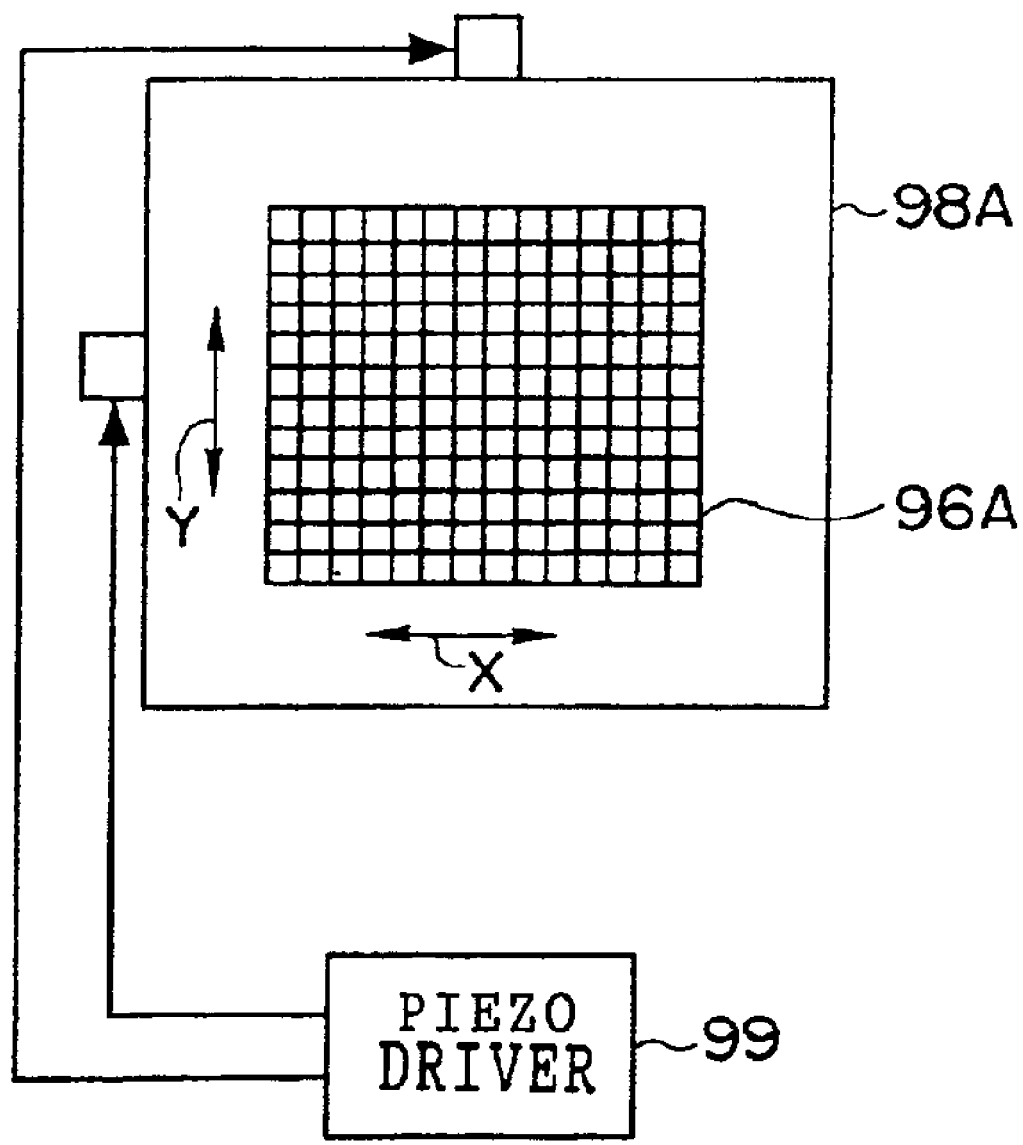

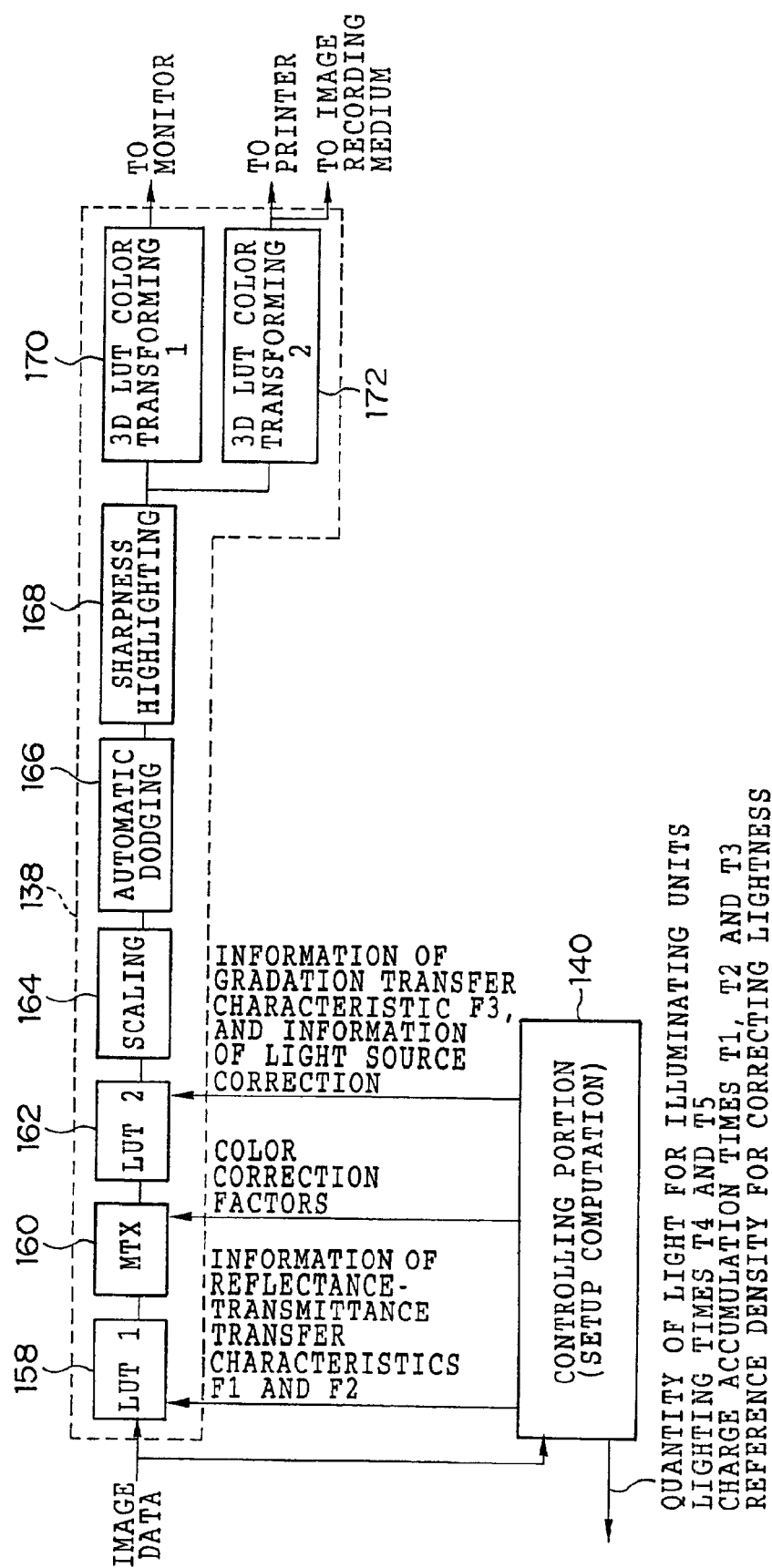

IMAGE READING APPARATUS, IMAGE RECORDING MEDIUM AND IMAGE FORMING APPARATUS

BACKGROUND OF THE INVENTION

1. Field of the Invention

The present invention relates to an image reading apparatus, an image recording medium and an image forming apparatus. Specifically, the present invention relates to an image reading apparatus, which reads silver images recorded on a color photosensitive material on the basis of light reflected by the color photosensitive material and light transmitted through the color photosensitive material; an image recording medium, on which image data or the like read by the image reading apparatus is recorded; and an image forming apparatus, which regenerates the image data recorded on the image recording medium so as to form images.

2. Description of the Related Art

A photosensitive material using silver halide has been developed more and more in recent years, and at present, high-quality color images can be easily obtained. For example, in a method generally called color photography, the photography is performed by using a color negative film, and image information recorded on the color negative film, which has been developed, is optically printed onto a color photographic printing paper so as to obtain a color print. In recent years, this process has been developed to a high degree, and large-scale centers which produce a large number of color prints with high-efficiency, i.e., large laboratories, or small and simple printer processors located at stores, i.e., mini-laboratories have been spread. As a result, everyone can easily enjoy color photography.

A principle of color photography which is popular at present employs color reproduction due to a subtractive color process. In a general color negative, photosensitive layers using silver halide emulsions, which are photosensitive elements in which photosensitivity is imparted to blue, green and red areas, are provided on a transmissive support, and so-called color couplers which form yellow, magenta and cyan dyes, each of which is a hue which is to become a complementary color, are combined and contained in the photosensitive layers. The color negative film, which has been exposed image-wise by photography, is developed in color developer containing an aromatic primary amine developing agent. At this time, the exposed silver halide particles are developed, i.e., reduced by the developing agent so as to produce metallic silver, and simultaneously produced oxidants of the developing agent are coupled with the above-mentioned color couplers so as to form each dye. The metallic silver (developed silver) generated by the development and unreacted silver halide are respectively removed by bleaching and fixing processes so as to obtain color images. A color photographic printing paper, which is a color photosensitive material, in which photosensitive layers having a combination of photosensitive wavelength areas and color hues which are similar to those of the film are applied onto a reflective support, is optically exposed through the developed color negative film; and the color photographic printing paper is subjected to the same color developing, bleaching and fixing processes. As a result, color prints consisting of color images in which original scenes are reproduced can be obtained.

These systems are being widely spread at present. However, it is being more and more strongly required that the simplicity of the systems be improved. For example, in Japanese Patent Application Laid-Open (JP-A) No. 6-295035 and U.S. Pat. No. 5,519,510, an image forming method is described, in which, without forming dye images, image information representing image-exposure for each of blue, red and green portions is extracted from silver halide color photographic elements, i.e., silver images. In this method, photosensitive material can be designed without using coloring material, and even if coloring material is used, images can be read without coloring. Further, in this method, one image is read a number of times at predetermined intervals, and a satisfactory image in a wide dynamic range is obtained.

In a case in which images are read from a monochromatically developed color photographic film in this manner, reading conditions, which are completely different from those in a general case in which images are read from a color-developed color photographic film or from a monochromatically developed monochromatic photographic film, are required. However, in conventional processing systems, the monochromatically developed color photographic film could not be distinguished from the other films, and thus, such problem that reading is not suitably performed was caused.

Moreover, a color photographic film is originally used to form transmitted images. While a color paper efficiently reflects light by a baryta layer thereof, a color photographic film does not have a function for efficiently reflecting incident light, and thus, a large quantity of light is lost at the time of image reading. Therefore, there was such problem that, if the quantity of light is not large or a lot of time is not spent when the reading is performed, it is difficult for photoelectric conversion elements to obtain sufficient light and output signals with a high SN-ratio.

Further, when images are read from a support side (base side), an anti-halation layer consisting of silver colloid damps the light. Therefore, there was such problem that, if an even larger quantity of light is not irradiated or if a longer time is not taken for reading, the signals with a high SN-ratio cannot be obtained.

SUMMARY OF THE INVENTION

It is an object of the present invention to provide an image reading apparatus, which can set reading conditions after clearly identifying the film as a monochromatically developed color photographic film, and which can obtain images in wide dynamic ranges. It is another object of the present invention to provide an image reading apparatus, in which reproduction of a highlight portion and a shadow portion of an image can be adjusted while the image is being viewed, and in which a more satisfactory image in a wider dynamic range can be obtained; and which can easily cope with reorder and remake.

Further, it is still another object of the present invention to provide an image reading apparatus, which can read images without it being necessary to irradiate a large quantity of light or without requiring a long time.

The first aspect of the present invention is an image reading apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, the apparatus comprising: light sources, which irradiate light at an emulsion surface side and a support surface side of the color photosensitive material, respectively; sensors, which read reflected images corresponding to lights reflected by each of the emulsion surface side and the support surface side of the color photosensitive material, and which read a transmitted image corresponding to a light transmitted through the color photosensitive material; and a reading conditions changing portion, which changes reading conditions of the sensors on the basis of information applied to the color photosensitive material.

The second aspect of the present invention according to the first aspect is an image reading apparatus, wherein the reading conditions include at least one of reading timing and number of times of reading.

The third aspect of the present invention according to the first aspect is an image reading apparatus, wherein the information is one of information instructing reading in accordance with a state of the silver image, or information representing a type of the color photosensitive material.

The fourth aspect of the present invention according to the first aspect is an image reading apparatus, wherein the reading conditions changing portion changes the reading timing by changing a conveying speed of the color photosensitive material.

The fifth aspect of the present invention according to the first aspect is an image reading apparatus, wherein the sensors are area sensors, and the reading conditions changing portion changes the reading timing of the area sensors in a state in which the color photosensitive material is not being conveyed.

The sixth aspect of the present invention according to the first aspect is an image reading apparatus, further comprising a data composing portion, in which a predetermined weighting factor is applied to each of image data of one frame image, which image data is obtained by a number of readings, so as to make the weighted image data into one composite image data.

The seventh aspect of the present invention is an image recording medium, on which image data read by an image reading apparatus, together with reading conditions under which an image relating to the image data is read, are recorded; wherein the image reading apparatus is an apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, the apparatus comprising: light sources, which irradiate light at an emulsion surface side and a support surface side of the color photosensitive material, respectively; sensors, which read reflected images corresponding to lights reflected by each of the emulsion surface side and the support surface side of the color photosensitive material, and which read a transmitted image corresponding to a light transmitted through the color photosensitive material; and a reading conditions changing portion, which changes reading conditions of the sensors on the basis of information applied to the color photosensitive material.

The eighth aspect of the present invention is an image forming apparatus, which regenerates a plurality of image data for one frame image, which image data are recorded on an image recording medium, by applying a predetermined weighting factor in accordance with conditions under which the image is read, so as to form the image; wherein the image recording medium is a medium, on which image data read by an image reading apparatus, together with reading conditions under which an image relating to the image data is read, are recorded; wherein the image reading apparatus is an apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, the apparatus comprising: light sources, which irradiate light at an emulsion surface side and a support surface side of the color photosensitive material, respectively; sensors, which read reflected images corresponding to lights reflected by each of the emulsion surface side and the support surface side of the color photosensitive material, and which read a transmitted image corresponding to a light transmitted through the color photosensitive material; and a reading conditions changing portion, which changes reading conditions of the sensors on the basis of information applied to the color photosensitive material.

The ninth aspect of the present invention according to the first aspect is an image reading apparatus, wherein the light sources irradiate light, having at least one of wavelength and light quantity being different from that of the other, at the emulsion surface side and the support surface side of the color photosensitive material, respectively.

The tenth aspect of the present invention according to the ninth aspect is an image reading apparatus, wherein quantity of light irradiated at the support surface side and quantity of light irradiated at the emulsion surface side can be changed in accordance with the type of the color photosensitive material.

The eleventh aspect of the present invention according to the ninth aspect is an image reading apparatus, wherein the sensors are area sensors.

The twelfth aspect of the present invention is an image reading apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, the apparatus comprising: light sources, which irradiate light at an emulsion surface side and a support surface side of the color photosensitive material, respectively; and area sensors, which read reflected images corresponding to lights reflected by each of the emulsion surface side and the support surface side of the color photosensitive material, and which read a transmitted image corresponding to a light transmitted through the color photosensitive material.

The thirteenth aspect of the present invention according to the twelfth aspect is an image reading apparatus, which extracts property quantities for reflected images and a transmitted image read by the sensors, and makes the reflected images and the transmitted image into one composite image on the basis of the extracted property quantities, so that the reflected images and the transmitted image are coincident with each other.

The fourteenth aspect of the present invention according to the twelfth aspect is an image reading apparatus, wherein the light sources irradiate light having different wavelengths, at the emulsion surface side and the support surface side of the color photosensitive material, respectively, such that the reflected images and the transmitted image are simultaneously read.

The fifteenth aspect of the present invention according to the twelfth aspect is an image reading apparatus, wherein the light sources irradiate light alternately at the emulsion surface side and the support surface side, respectively, such that the reflected image at the emulsion surface side and the reflected image at the support surface side are alternately read, and the transmitted image is read simultaneously with one of the reflected image at the emulsion surface side and the reflected image at the support surface side.

The sixteenth aspect of the present invention according to the twelfth aspect is an image reading apparatus, which reads one image a number of times in accordance with a state of the silver image.

The seventeenth aspect of the present invention according to the twelfth aspect is an image reading apparatus, wherein the light sources irradiate infrared light.

The eighteenth aspect of the present invention according to the first aspect is an image reading apparatus, comprising: a first light source, which irradiates light at the emulsion surface side of the color photosensitive material; a second light source, which irradiates light at the support surface side of the color photosensitive material; a first sensor, which reads a reflected image at the emulsion surface side, which image corresponds to light reflected by the emulsion surface side of the color photosensitive material; and a second sensor, which reads a reflected image at the support surface side, which image corresponds to light reflected by the support surface side of the color photosensitive material.

The nineteenth aspect of the present invention according to the eighteenth aspect is an image reading apparatus, wherein the second sensor reads a transmitted image which corresponds to light irradiated from the first light source and transmitted through the color photosensitive material.

The twentieth aspect of the present invention according to the nineteenth aspect is an image reading apparatus, wherein the first sensor reads a transmitted image which corresponds to light irradiated from the second light source and transmitted through the color photosensitive material.

The twenty-first aspect of the present invention according to the eighteenth aspect is an image reading apparatus, wherein reading ranges on the color photosensitive material by the first sensor are set so that adjacent reading ranges partially overlap with each other.

The twenty-second aspect of the present invention according to the eighteenth aspect is an image reading apparatus, wherein reading ranges on the color photosensitive material by the second sensor are set so that adjacent reading ranges partially overlap with each other.

According to the first aspect, the reading conditions changing portion changes the reading conditions of the sensors on the basis of the information applied (added) to the color photosensitive material. Therefore, after clearly identifying the film as a monochromatically developed color photographic film, the reading conditions can be changed, and images in wide dynamic ranges can be obtained.

At least one of the reading timing and the number of times of reading which are the reading conditions according to the second aspect can be changed. Further, according to the fourth aspect, the reading conditions changing portion may change the reading timing by changing a conveying speed of the color photosensitive material, or, according to the fifth aspect, when the sensors are area sensors, the reading conditions changing portion may change the reading timing of the area sensors in a state in which the color photosensitive material is not being conveyed.

According to the third aspect, the information is one of information instructing reading in accordance with a state of the silver image, or information representing a type of the color photosensitive material.

A silver density in a silver image increases in accordance with light exposure. When the silver density is extremely low, sometimes the image cannot be read, and on the other hand, when the silver density is extremely high, the image is difficult to read. Accordingly, according to the sixth aspect, a predetermined weighting factor is applied to each of image data obtained by a number of readings and a composite image data is formed. For example, the one silver image is read a number of times, and then, image data read after development has been proceeded much (carried out) is used for low silver density portions, and data read at the beginning of development is used for high silver density portions. As a result, a satisfactory image with a high SN-ratio and in a wider dynamic range can be obtained. In other words, a user can adjust reproduction of a highlight portion and a shadow portion of an image while viewing the image, and can easily handle reorder and remake.

According to the seventh aspect, the image data read by the image reading apparatus, together with the reading conditions under which an image relating to the image data is read, are recorded on the image recording medium. If the image recording medium is returned to a user, the user himself can adjust reproduction of the highlight portion and the shadow portion of the image by using the image forming apparatus of the eighth aspect. This image forming apparatus regenerates the image data for one frame image, which image data are recorded on the image recording medium, by applying a predetermined weighting factor in accordance with the conditions under which the image is read, and forms the image.

According to the ninth aspect, the light sources irradiate light, having at least one of wavelength and quantity being different from that of the other, at the emulsion surface side and the support surface side of the color photosensitive material, respectively.

According to the fourteenth aspect, the emulsion surface side and the support surface side of the color photosensitive material is respectively illuminated by light having different wavelengths, thereby the reflected image at the emulsion surface side, the reflected image at the support surface side, and the transmitted image can be simultaneously read. Therefore, images can be read in a short time, and a large quantity of light does not need to be irradiated for a long time for one reading image, and thus, the photosensitive material can be prevented from being damaged by heat. Further, the emulsion surface side and the support surface side of the color photosensitive material are respectively illuminated by light whose quantities are different from each other. Thus, the quantity of light irradiated at the support surface side, where there is a large amount of damping of light, can be increased, and on the other hand, quantity of light irradiated at the emulsion surface side can be decreased. As a result, a large quantity of light does not need to be irradiated for one reading image, and thus, the photosensitive material can be prevented from being damaged by heat.

When, according to the fifteenth aspect, the light sources irradiate light alternately at the emulsion surface side and the support surface side, respectively, so as to alternately read the reflected image at the emulsion surface side and the reflected image at the support surface side, and so as to simultaneously read the transmitted image and one of the reflected images, the images can be read in a shorter time, as compared with when the transmitted image and one of the reflected images are individually read.

According to the tenth aspect, quantity of light irradiated at the support surface side and quantity of light irradiated at the emulsion surface side can be changed in accordance with the type of the color photosensitive material. For example, in a case of a film on which an anti-halation layer or the like using silver colloid is provided, if the quantity of light at the support surface side, where light is damped by the anti-halation layer or the like, is made larger than the quantity of light at the emulsion surface side, a large quantity of light does not need to be irradiated for one reading image.

When area sensors are used as the reading sensors according to the eleventh and twelfth aspects, light is not concentrated on one portion as compared with when line sensors are used, and thus, images can be read without heat being concentrated on one portion of the color photosensitive material.

When silver images recorded on a color photosensitive material, in which positions of the silver images are difficult to detect, are read by the area sensors, if, according to the twenty-first and twenty-second aspects, the silver images are read so that adjacent reading ranges partially overlap with each other, and after reading, the images are made into one composite image, image reading error can be avoided.

When images are made into one composite image, according to the thirteenth aspect, property quantities for the images read by the sensors are extracted, and the images are made into one composite image on the basis of the extracted property quantities, so that the reflected images and the transmitted image are coincident with each other.

According to the seventeenth aspect, images can be read by using infrared light as well as light having various wavelengths, i.e., red light (R light), green light (G light) and blue light (B light).

The reading sensors can consist of a sensor for low resolution, which reads reflected image information corresponding to light reflected by the emulsion surface side of the color photosensitive material with low resolution; a sensor for low resolution, which reads reflected image information corresponding to light reflected by the support surface side of the color photosensitive material with low resolution; and a sensor for high resolution, which reads transmitted image information corresponding to light transmitted through the color photosensitive material with high resolution.

Further, the reading sensors may consist of a dual purpose sensor, which reads reflected image information corresponding to light reflected by one of the emulsion surface side and the support surface side of the color photosensitive material with low resolution, and which reads transmitted image information corresponding to light transmitted through the color photosensitive material with high resolution; and a sensor for low resolution, which reads reflected image information corresponding to light reflected by the other of the emulsion surface side and the support surface side of the color photosensitive material with low resolution. In this manner, in place of two sensors, the dual purpose sensor is used for reading the reflected image information and the transmitted image information, and the apparatus can be thereby simplified so as to save cost.

As the sensor for low resolution, the sensor for high resolution, and the dual purpose sensor, for example, area CCDs which can read one frame image of the color photosensitive material all at once, or linear CCDs which can read an image for one line, can be used.

BRIEF DESCRIPTION OF THE DRAWINGS

FIG. 10 is a bottom view of the jetting tank.

FIG. 12A is a bottom view of an illuminating unit.

FIG. 12B is a side view of the illuminating unit.

FIG. 13 is a graph showing wavelength of irradiated light.

FIG. 16 is a view showing a DX code.

FIGS. 17A–17F are timing charts showing image reading timing.

FIG. 18 is a schematic structural view of a pixel shifting unit.

FIG. 19 is a schematic structural view of an image processing portion.

DESCRIPTION OF THE PREFERRED EMBODIMENTS

Hereinafter, embodiments of an image reading apparatus according to the present invention will be described. The image reading apparatus monochromatically develops a color photographic film, which has three types of photosensitive layers, i.e., a blue photosensitive layer (B layer), a green photosensitive layer (G layer) and a red photosensitive layer (R layer), on a support, so as to generate silver images including no color information. After developing, the image reading apparatus dries the color photographic film without bleaching, fixing and rinsing, and before or after drying, the image reading apparatus reads the silver images recorded on the color photographic film. When the color photographic film has been monochromatically developed, the silver images can be read by using a light source of red light (R light), green light (G light) and blue light (B light). However, in the present embodiments, a case in which the silver images are read by using infrared light will be described. When the images are read in a state in which development is not stopped or is being proceeded, if R, G and B light is used, such trouble that silver halide is exposed to the reading light is caused. On the other hand, if IR light is used, such trouble can be avoided.

First Embodiment

Figure 1:
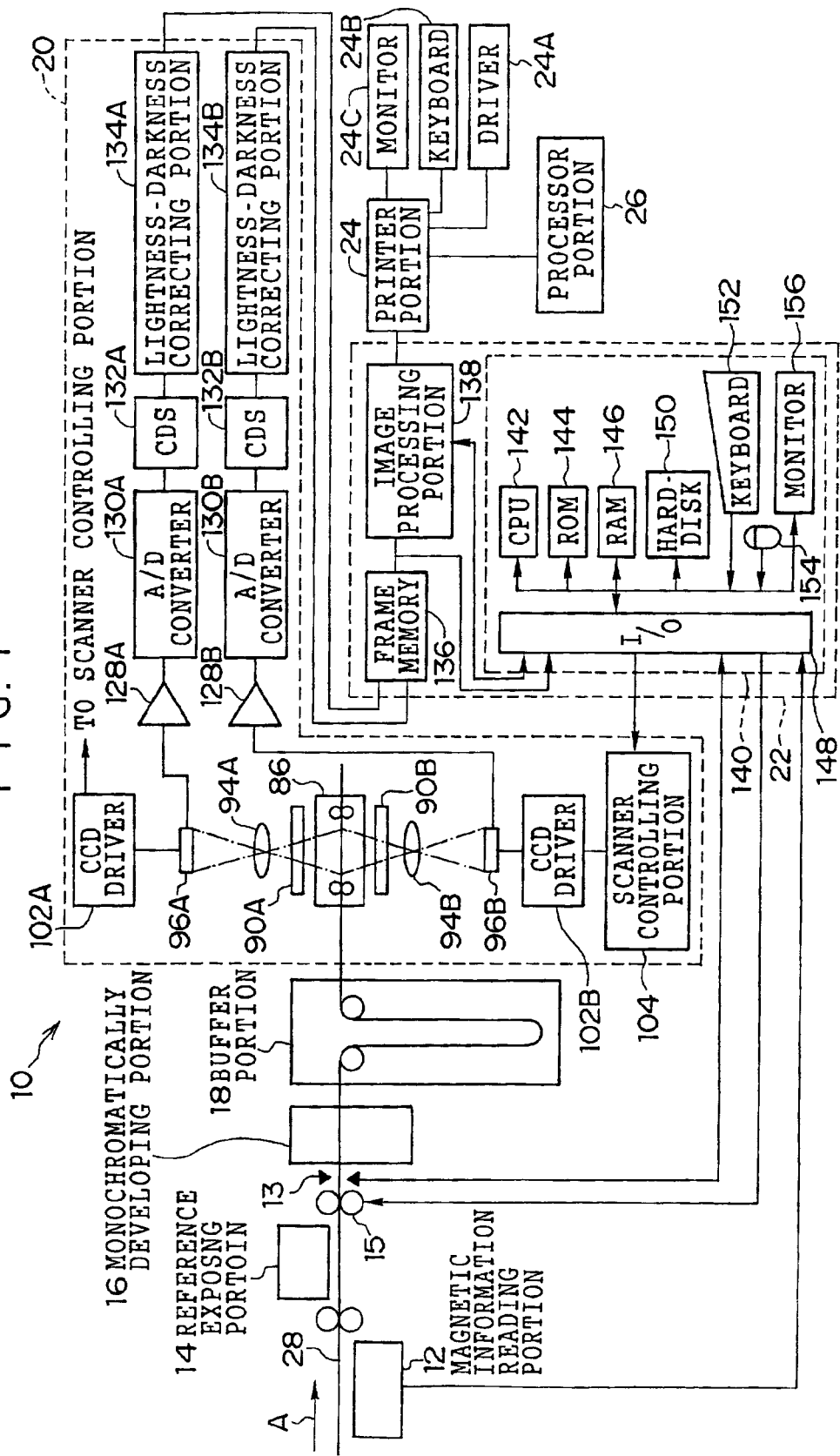
FIG. 1 is an overall structural view of an image processing system according to an embodiment of the present invention.

FIG. 1 shows an overall structure of an image processing system 10. As shown in FIG. 1, the image processing system 10 consists of a magnetic information reading portion 12, a reference exposing portion 14, a perforation detecting sensor 13 which is used when an APS film is being read, a monochromatic developing portion 16, a buffer portion 18, a film scanner 20, an image processing device 22, a printer portion 24 and a processor portion 26. The perforation detecting sensor 13 is structured so that a light emitting element and a light receiving element are disposed opposite to each other.

The image processing system 10 reads film images (silver images) recorded on a color photographic film such as a negative film or a reversal film (positive film), performs an image processing, and prints the processed images on photographic printing papers. The image processing system 10 can process film images on, for example, the following types of photographic films: a 135 size photographic film, a 110 size photographic film, a photographic film on which transparent magnetic layers are formed (240 size photographic film, known as an APS film), and 120 size and 220 size (Brownie size) photographic films. A photographic film 28 is conveyed in the direction of arrow A in FIG. 1, in a state in which an emulsion surface side (B photosensitive layer side) thereof is at the top. The image processing system may form images on thermosensitive papers by using heat, or may form images on recording media such as plain paper by using xerography, ink jet or the like.

When the photographic film 28 to be processed is an APS film shown in FIG. 2, the magnetic information reading portion 12 is used to read magnetic information recorded on magnetic layers 30, which are formed below frame images of the APS film 28A. In the first embodiment, before reading images, information regarding reading conditions (reading timing and number of times of reading) is provided as magnetic information onto the photographic film 28 to be processed. On the basis of the information, the reading conditions (reading timing and number of times of reading) are set at a scanner controlling portion 104. As other information regarding the film type such as film sensitivity information and a DX code is also provided as magnetic information onto the photographic film 28, the reading conditions may be set at the scanner controlling portion 104 on the basis of the information regarding the film type.

Figure 2:
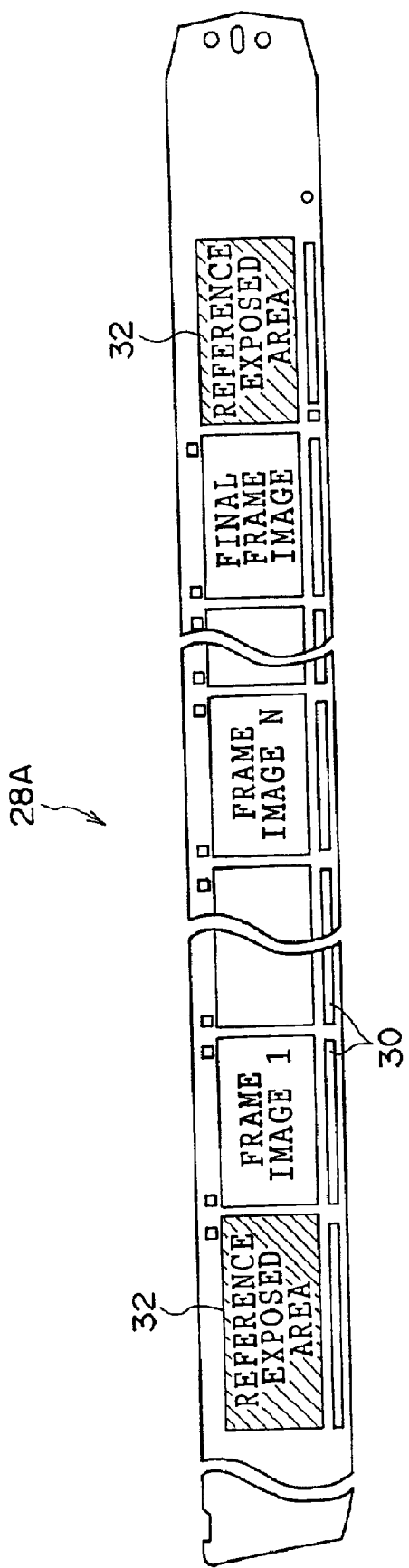
FIG. 2 is a plan view of an APS film.

As shown in FIG. 2, unexposed areas which a user can freely use are provided at a front end side and a rear end side of the APS film 28A. In the first embodiment, the unexposed areas are used as reference exposed areas 32. When the photographic film 28 is a 135 size photographic film, an unexposed portion shown in FIG. 3, which exists at a front end side or a rear end side of the film, is used as the reference exposed area 32.

When the photographic film 28 to be processed is an APS film, the perforation detecting sensor 13 detects perforations. On the basis of the detected perforations, a controlling portion 140 controls conveying rollers 15, so as to specify a range to which developer is applied in the monochromatic developing portion 16, which will be described later.

The reference exposing portion 14 exposes (reference-exposes) the reference exposed area 32 in order to form image information which is used to determine image processing conditions. The image processing conditions may be determined after reading all of the frame images, by storing data obtained from read frame images, and by reading the image information in the reference exposed area 32, for example, at the rear end side. However, if the image processing conditions are determined before reading the frame images, the image processing can be performed while reading the frame images, and thus, preferably, the reference exposed area 32 at the front end side of the photographic film 28 is exposed so that the image processing conditions can be determined before reading the frame images.

Figure 4:
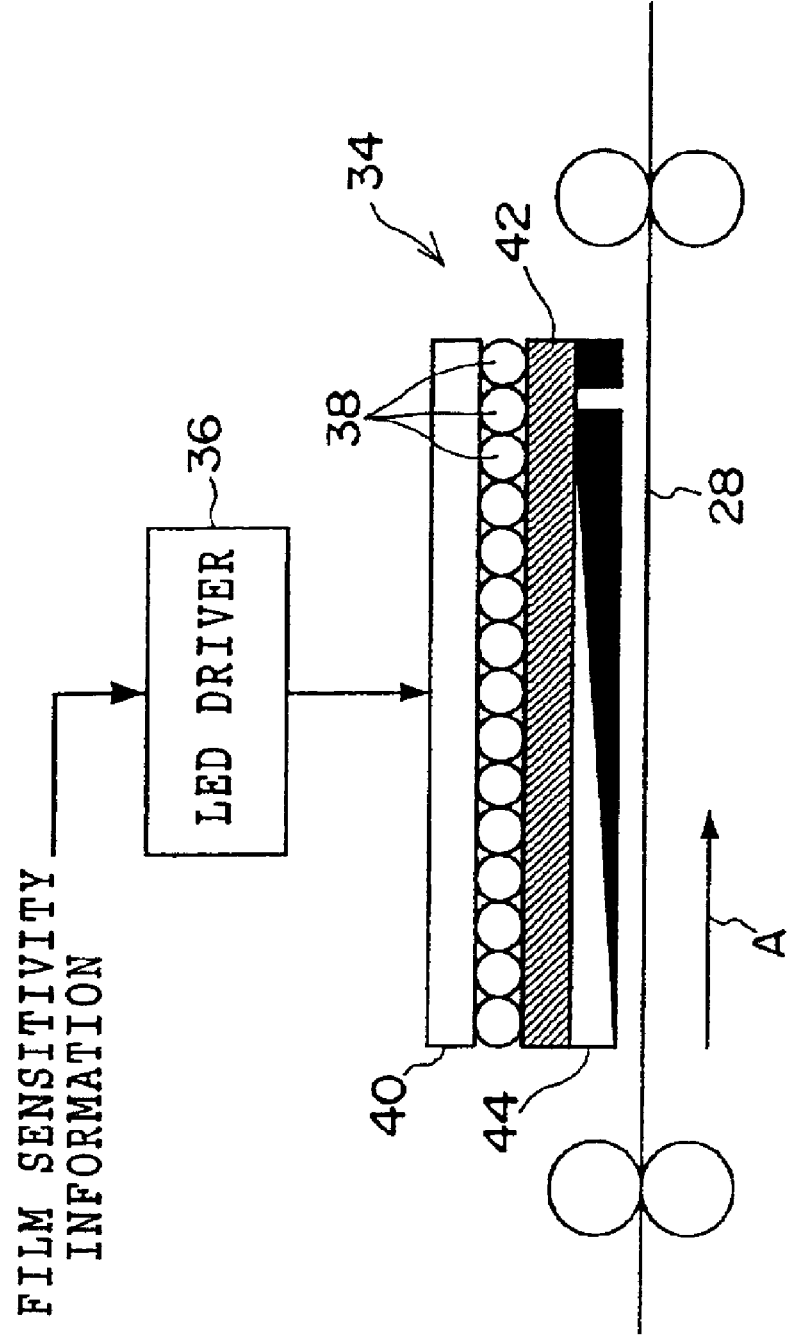
FIG. 4 is a schematic structural view of a reference exposing portion.

As shown in FIG. 4, the reference exposing portion 14 consists of an exposing portion 34 and an LED driver 36. The exposing portion 34 is provided with a diffusing plate 42 at an LED side of an LED substrate 40 on which a plurality of LEDs 38 are arranged, and is further provided with a wedge 44, which causes light-intensity distribution along a film conveying direction, at a light diffusing side of the diffusing plate 42.

Figure 5:
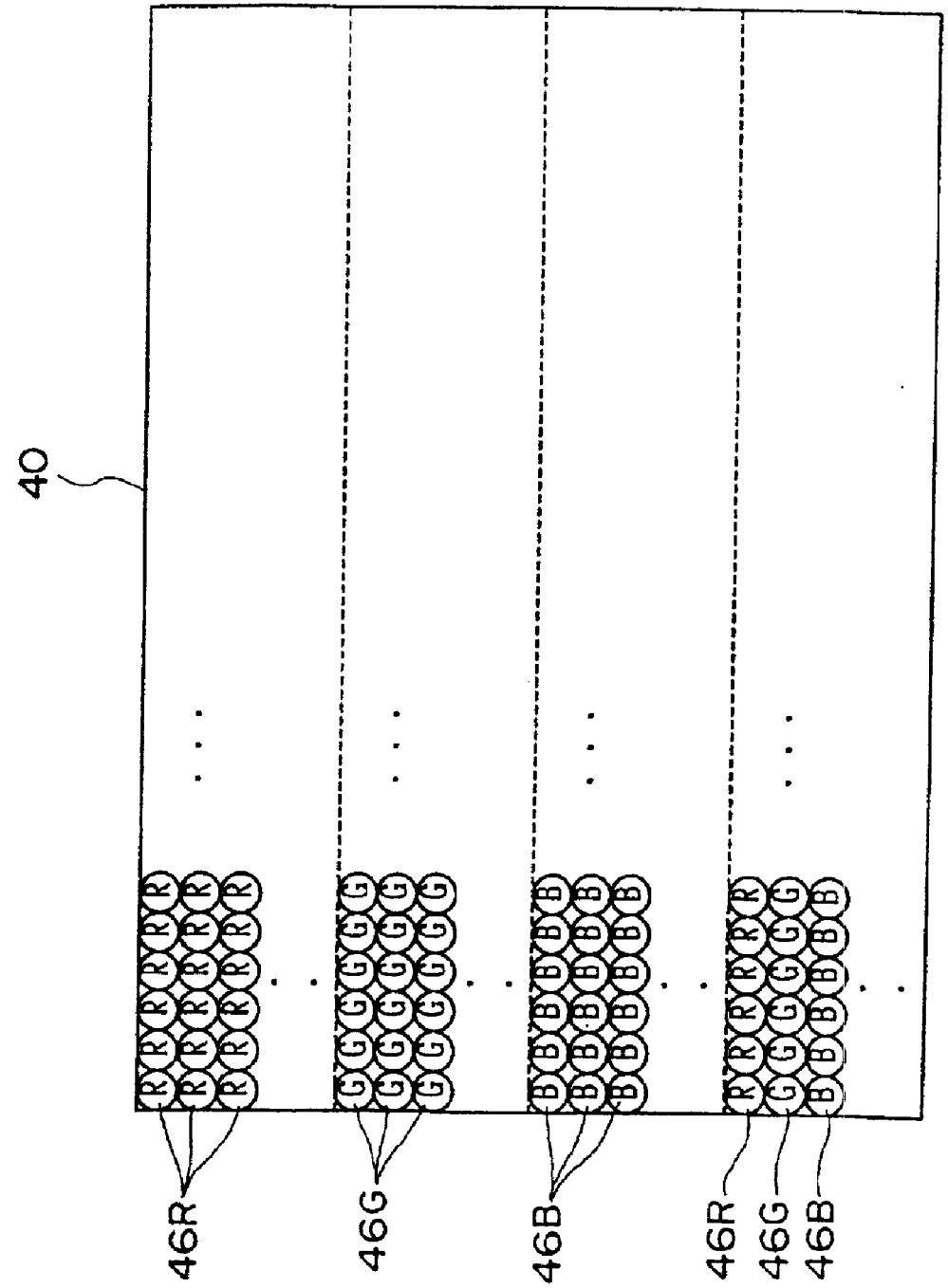
FIG. 5 is a plan view of an LED substrate.

As shown in FIG. 5, the LED substrate 40 is separated into four areas. In a topmost area in FIG. 5, LEDs 46R emitting red light (R light) are disposed; in a second area from the top, LEDs 46G emitting green light (G light) are disposed; in a third area from the top, LEDs 46B emitting blue light (B light) are disposed; and in a bottommost area, the LEDs 46R, the LEDs 46G and the LEDs 46B are alternately disposed. With regard to a balance of quantity of R, G and B light in the bottommost area, i.e., a gray exposing portion, numbers of the LEDs 46R, the LEDs 46G and the LEDs 46B are preferably determined so that a color temperature of this portion is close to that of standard daylight such as D65.

The LED substrate 40 is connected to the LED driver 36, and each LED 38 on the LED substrate 40 uniformly emits light by being supplied with a predetermined electric current from the LED driver 36. The LED driver 36 can suitably control the electric current supplied to the each LED 38 in accordance with the film type by, for example, obtaining film sensitivity information from the magnetic information reading portion 12.

Figure 3:
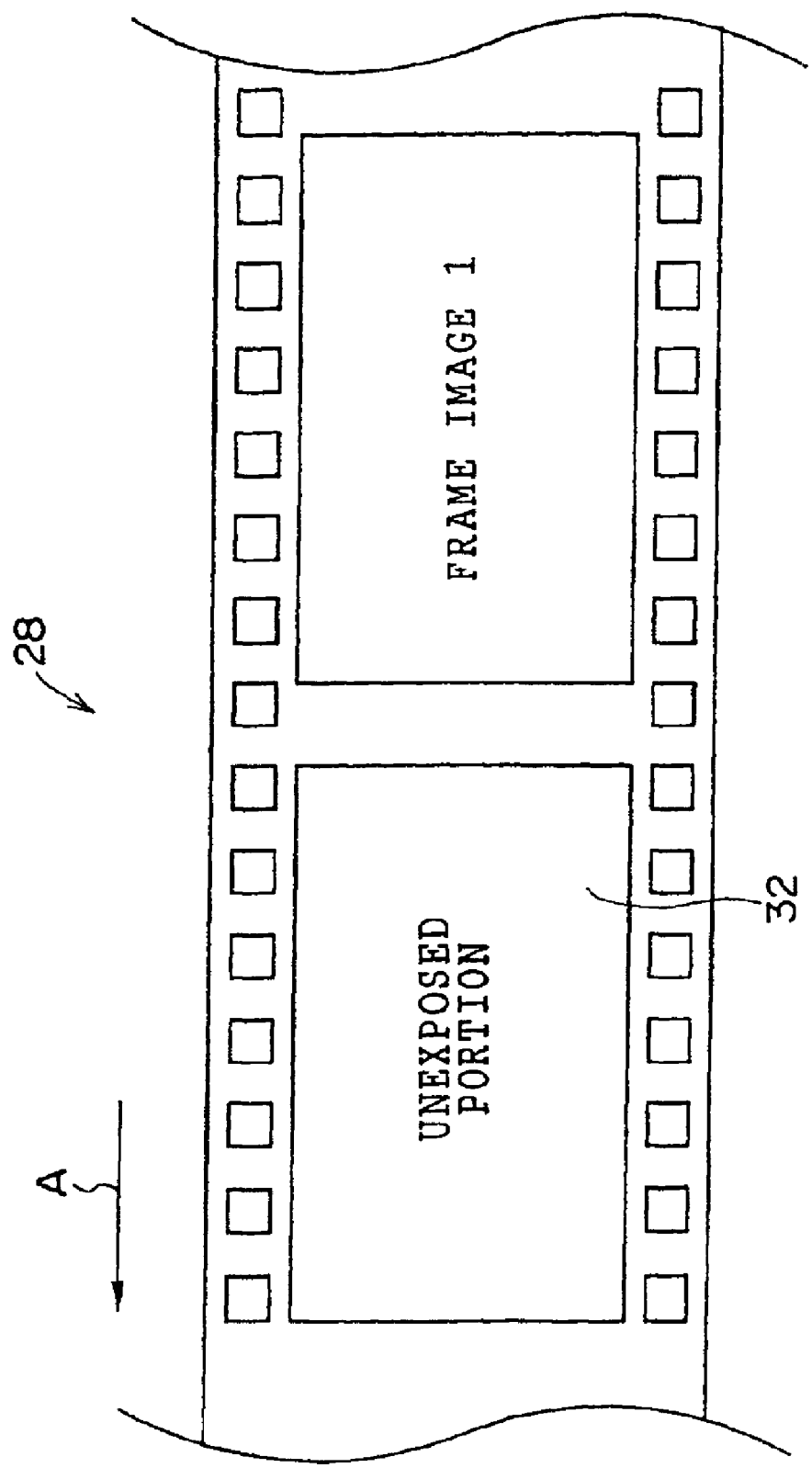
FIG. 3 is a plan view of a 135 size film.

Light emitted from the each LED is diffused by the diffusing plate 42, and is irradiated onto the photographic film 28 via the wedge 44. The wedge 44 is structured so as to change the light exposure onto the photographic film 28, for example, the wedge 44 is structured so as to increase the light exposure continuously (gradually) from an upstream side in the photographic film 28 conveying direction (direction of arrow A) toward a downstream side therein, as shown in FIG. 3. The light exposure may be increased step by step. The upstream side in the photographic film 28 conveying direction of the wedge 44 is structured such that the reference exposing portion 14 can expose linearly in a direction which is substantially orthogonal to the conveying direction, namely, a linearly area whose longitudinal direction is a direction which is substantially orthogonal to the conveying direction, as shown by line 48 in FIG. 6, can be formed on the photographic film 28. Further, the light exposure may be changed by increasing the electric current supplied to the each LED gradually along the film conveying direction.

Figure 6:
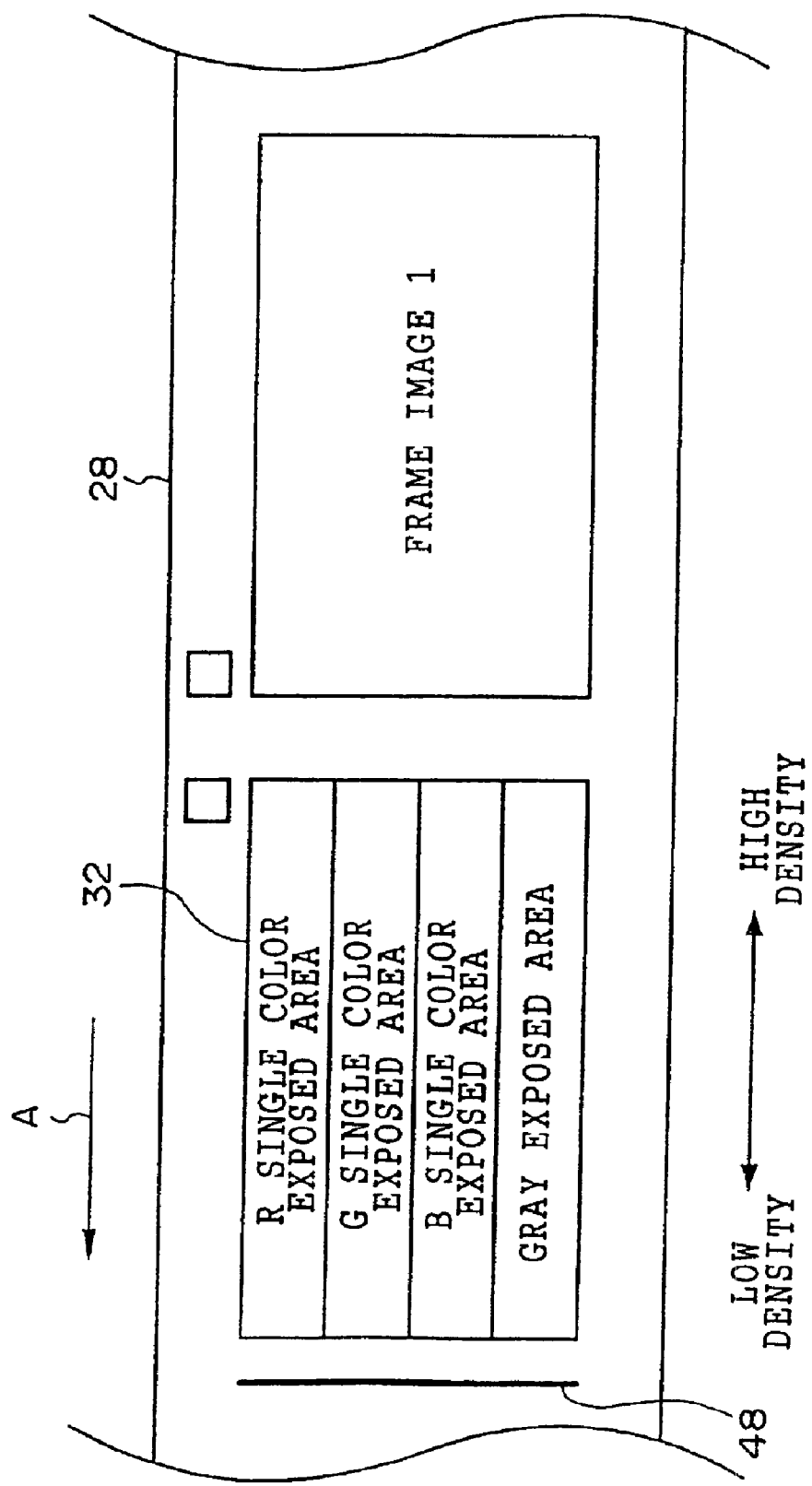
FIG. 6 is a view showing a reference exposed area of the APS film.

By the reference exposing portion 14 structured in this manner, the reference exposed area 32 of the photographic film 28 is exposed by the R light, the G light, the B light, and light in which the R light, the G light and the B light are mixed, i.e., gray light, as shown in FIG. 6. Further, a portion of the reference exposed area 32 is exposed linearly in the direction which is substantially orthogonal to the photographic film 28 conveying direction. The line 48 is detected as a trigger line, and it can be thereby detected that the reference exposed area 32 has been exposed (reference-exposed).

Figure 7:
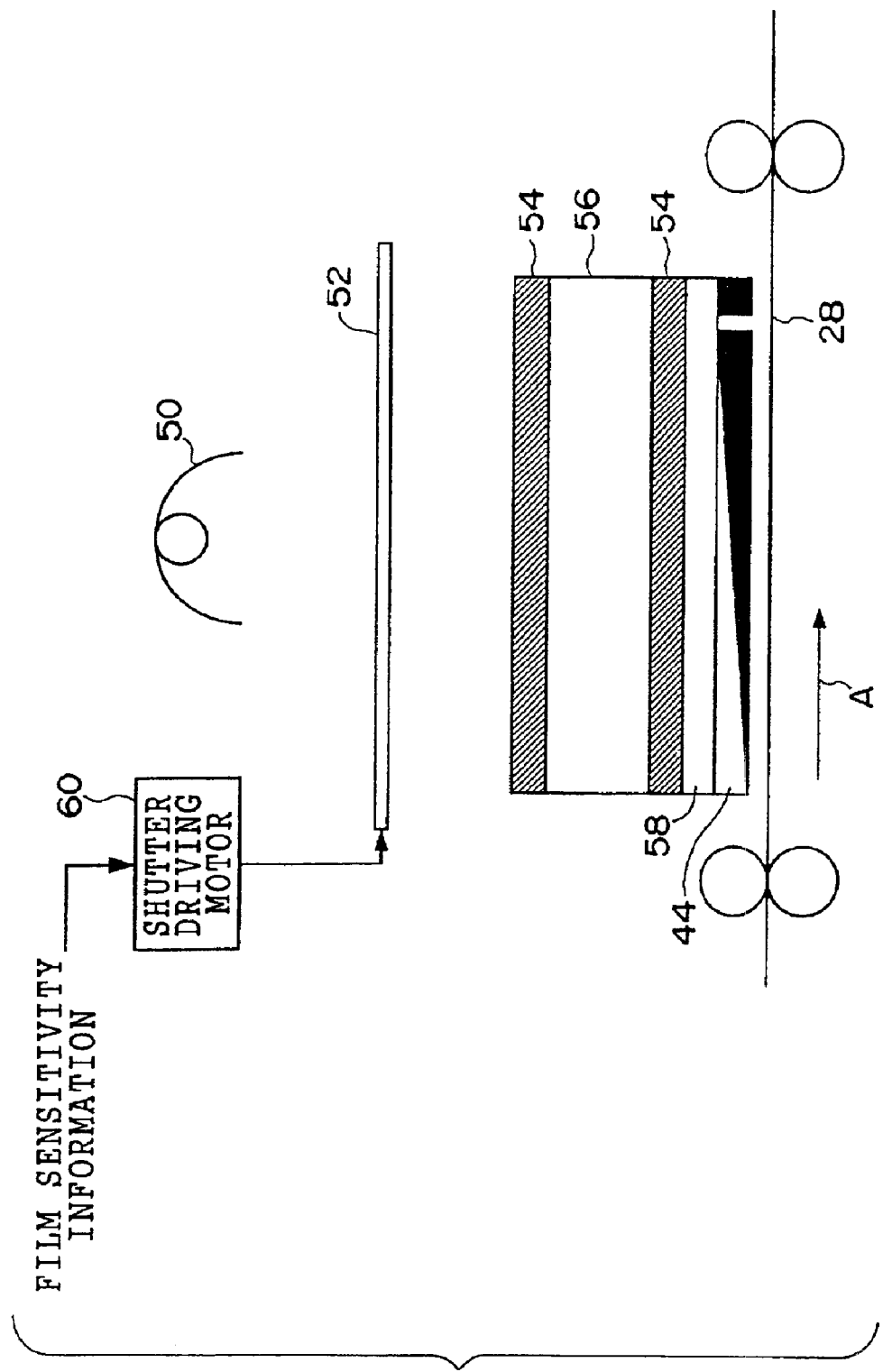
FIG. 7 is a schematic structural view showing another example of the reference exposing portion.

The reference exposing portion 14 may be structured by using, for example, a light source such as a halogen lamp in place of the LEDs, as shown in FIG. 7. The reference exposing portion 14 shown in FIG. 7 is provided with a halogen lamp 50, and a shutter 52 is disposed at a light irradiating side of the halogen lamp 50. A diffusing box 56 to the top and bottom of which diffusing plates 54 are attached, a color separating filter 58 which separates light into the R light, the G light and the B light, and the above-described wedge 44 are sequentially disposed at a light emitting side of the shutter 52.

The color separating filter 58 consists of a filter which transmits only R light of incident light, a filter which transmits only G light of incident light, and a filter which transmits only B light of incident light, and the filters are disposed in accordance with the LEDs arrangement in FIG. 5. For a portion in the color separating filter 58 which portion corresponds to the portion in which the LEDs 46R, 46G and 46B are alternately disposed, a color temperature transforming filter is preferably disposed so that a color temperature of this portion is close to that of standard daylight such as D65. As a result, the same exposure (reference-exposure) as in FIG. 6 can be performed. Further, in order to reduce cost, the correction may be performed based on a relationship between a color temperature of the halogen lamp 50 and a color temperature of D65, without disposing the filter.

Figure 8:
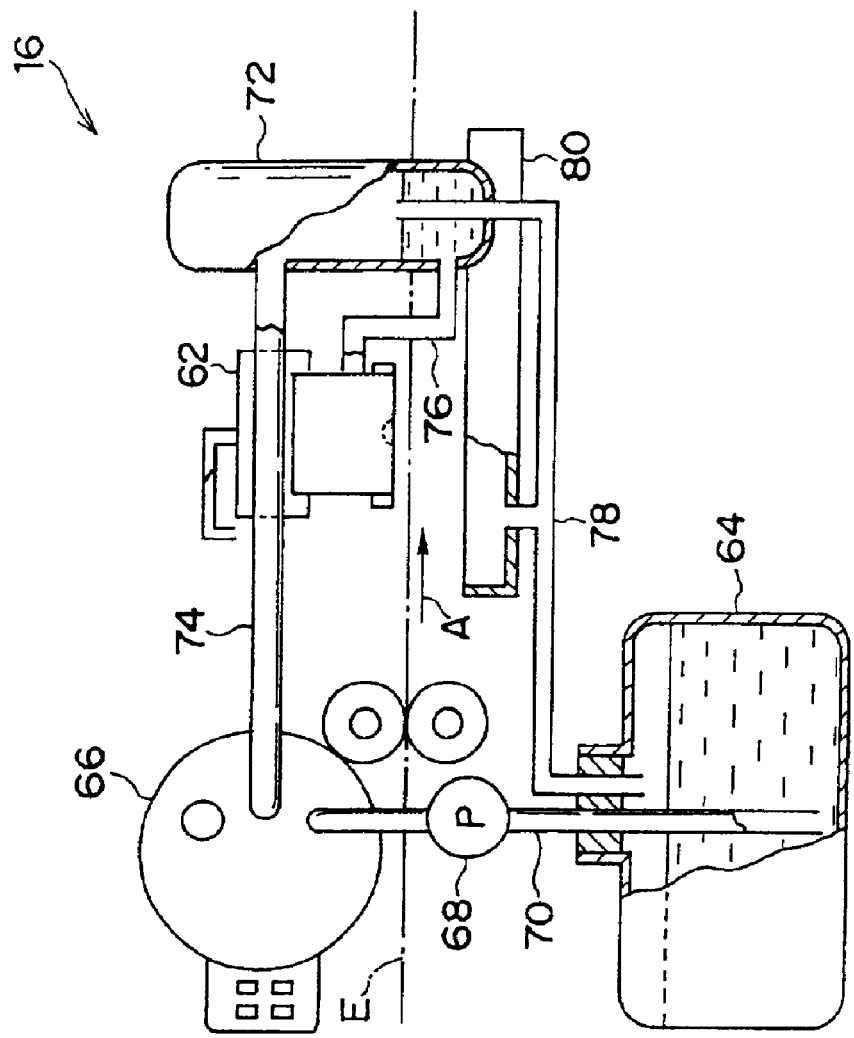
FIG. 8 is a schematic structural view of a developing portion.

The monochromatic developing portion 16 performs monochromatic development by applying developer for performing the monochromatic development to the photographic film 28. As described above, the conveying rollers 15 and the perforation detecting sensor 13 are disposed at an upstream side of the monochromatic developing portion 16. As shown in FIG. 8, the monochromatic developing portion 16 is provided with a jetting tank 62 for jetting developer onto the photographic film 28.

A developer bottle 64 for storing developer to be supplied to the jetting tank 62 is disposed at a lower-left side of the jetting tank 62, and a filter 66 for filtering the developer is disposed at an upper portion of the developer bottle 64. A developer conveying pipe 70, which is provided with a pump 68 at an intermediate portion thereof, connects the developer bottle 64 and the filter 66. Further, a sub-tank 72 for storing the developer conveyed from the developer bottle 64 is disposed at a right side of the jetting tank 62, and a developer conveying pipe 74 extends from the filter 66 to the sub-tank 72. Accordingly, when the pump 68 operates, the developer is conveyed from the developer bottle 64 toward the filter 66, and the developer filtered by passing through the filter 66 is conveyed to the sub-tank 72, where the developer is temporarily stored.

A developer conveying pipe 76 is disposed between the sub-tank 72 and the jetting tank 62 so as to connect the two. The developer conveyed with the pump 68 from the developer bottle 64 through the filter 66, the sub-tank 72, the developer conveying pipe 76 and the like eventually fills the jetting tank 62. A tray 80, which is connected to the developer bottle 64 by a circulation pipe 78, is disposed at a lower portion of the jetting tank 62. The tray 80 collects developer which overflows from the jetting tank 62, and returns the collected developer to the developer bottle 64 via the circulation pipe 78. Further, the circulation pipe 78 is connected to the sub-tank 72 in an extended state by protruding inside the sub-tank 72. The excess developer which has been stored in the sub-tank 72 is returned to the developer bottle 64 via the circulation pipe 78.

Figure 9:
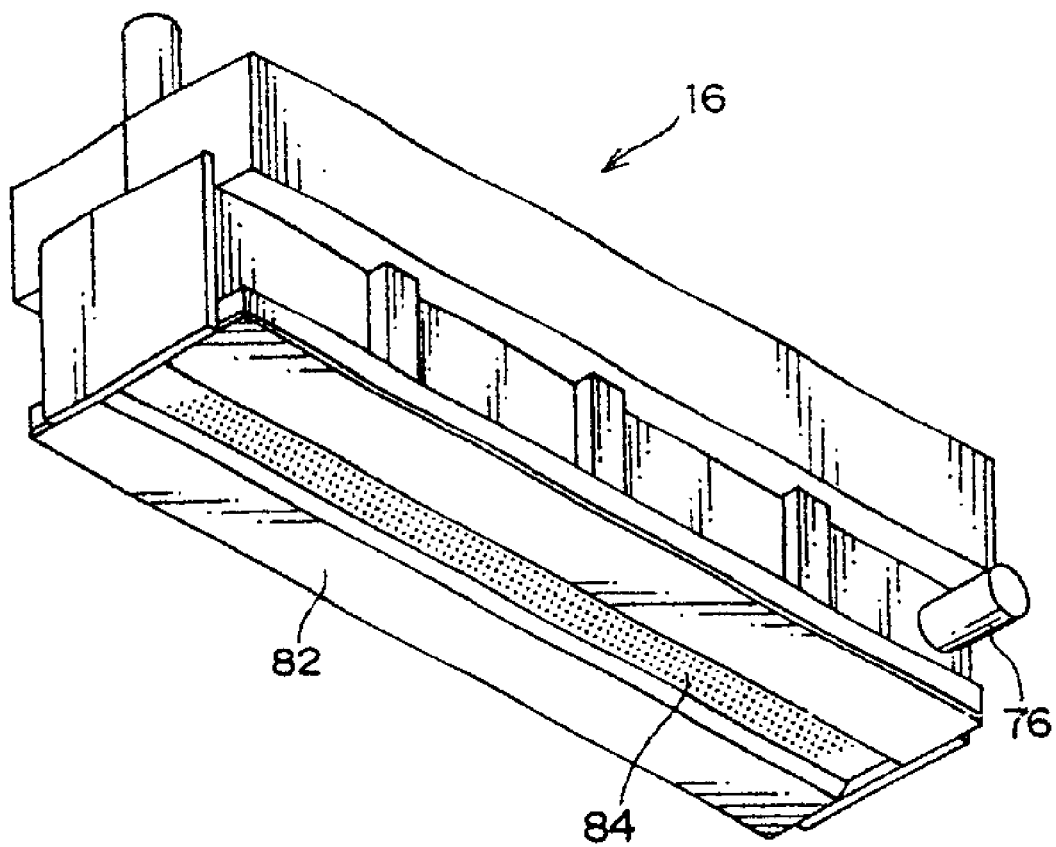
FIG. 9 is a perspective view of a jetting tank.

Further, as shown in FIGS. 9 and 10, a nozzle plate 82 formed by bending a thin, elastically deformable, rectangular plate is mounted at a portion which is one section among wall surfaces of the jetting tank 62 and faces a conveying path E of the photographic film 28. As shown in FIGS. 9 and 10, a plurality of nozzle holes 84 (each of which may, for example, have a diameter of several tens of $\mu$m) are respectively formed on the nozzle plate 82, along the direction intersecting the photographic film 28 conveying direction A, which is a longitudinal direction of the nozzle plate 82, and across the entire transverse direction of the photographic film 28 at regular intervals, so as to form a linearly extending nozzle array. A plurality of nozzle arrays are staggeringly arranged on the nozzle plate 82.

Namely, the plurality of nozzle arrays, each of which is formed by linearly arranging the plurality of nozzle holes 84, are respectively provided so as to extend in a longitudinal direction of the jetting tank 62, and the developer filling the jetting tank 62 can be expelled so as to be jetted from each of the nozzle holes 84 forming the nozzle arrays toward the photographic film 28. The developer is jetted from the jetting tank 62, and the photographic film 28 conveyed at a substantially constant speed is thereby monochromatically developed.

Figure 20A:
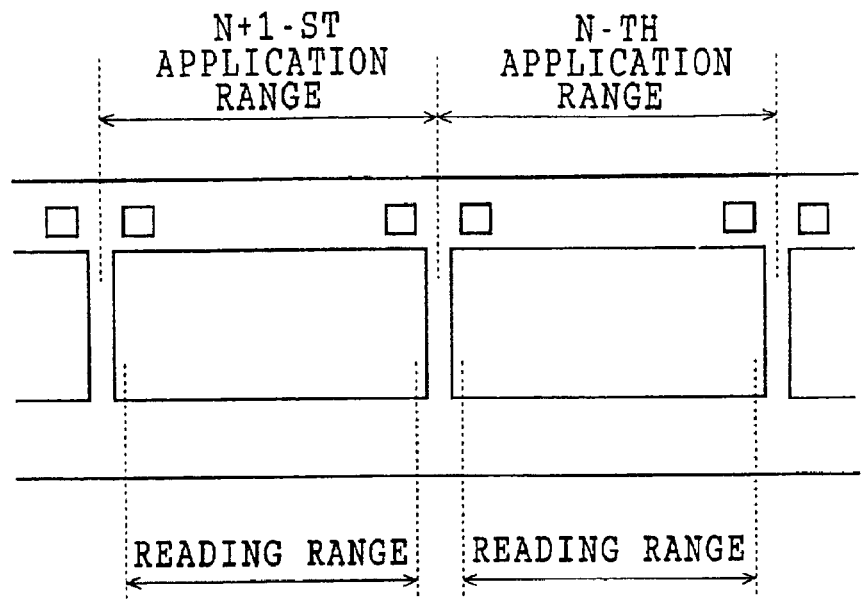
FIG. 20A is a plan view showing reading ranges of the APS film.
Figure 20B:
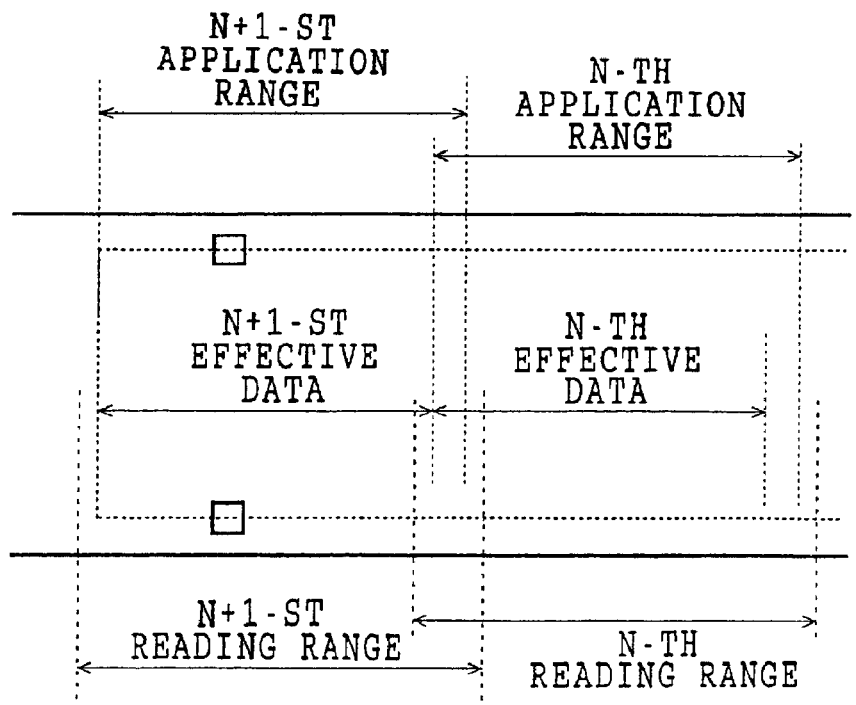
FIG. 20B is a plan view showing reading ranges of the 135 size film.

When the photographic film 28 is an APS film, positions of frame images can be specified by positions of perforations. Thus, perforations are detected by the perforation detecting sensor 13 such that conveyance of the photographic film 28 is controlled by the conveying rollers 15, and developer is thereby applied for each frame image, as shown in FIG. 20A. On the other hand, when the photographic film 28 is a 135 size photographic film, in order to prevent a portion of the film on which portion an image is recorded from not being applied of the developer, conveyance of the photographic film 28 is controlled by the conveying rollers 15, and developer is thereby applied so as to partially overlap with a former application range, as shown in FIG. 20B.

The buffer portion 18 is used to absorb a difference between a photographic film 28 conveying speed which becomes a substantially constant speed at the monochromatic developing portion 16, and a photographic film 28 conveying speed due to a film carrier 86 which will be described later. When the conveying speed at the monochromatic developing portion 16 is the same as the conveying speed due to the film carrier 86, the buffer portion 18 can be omitted.

Figure 11:
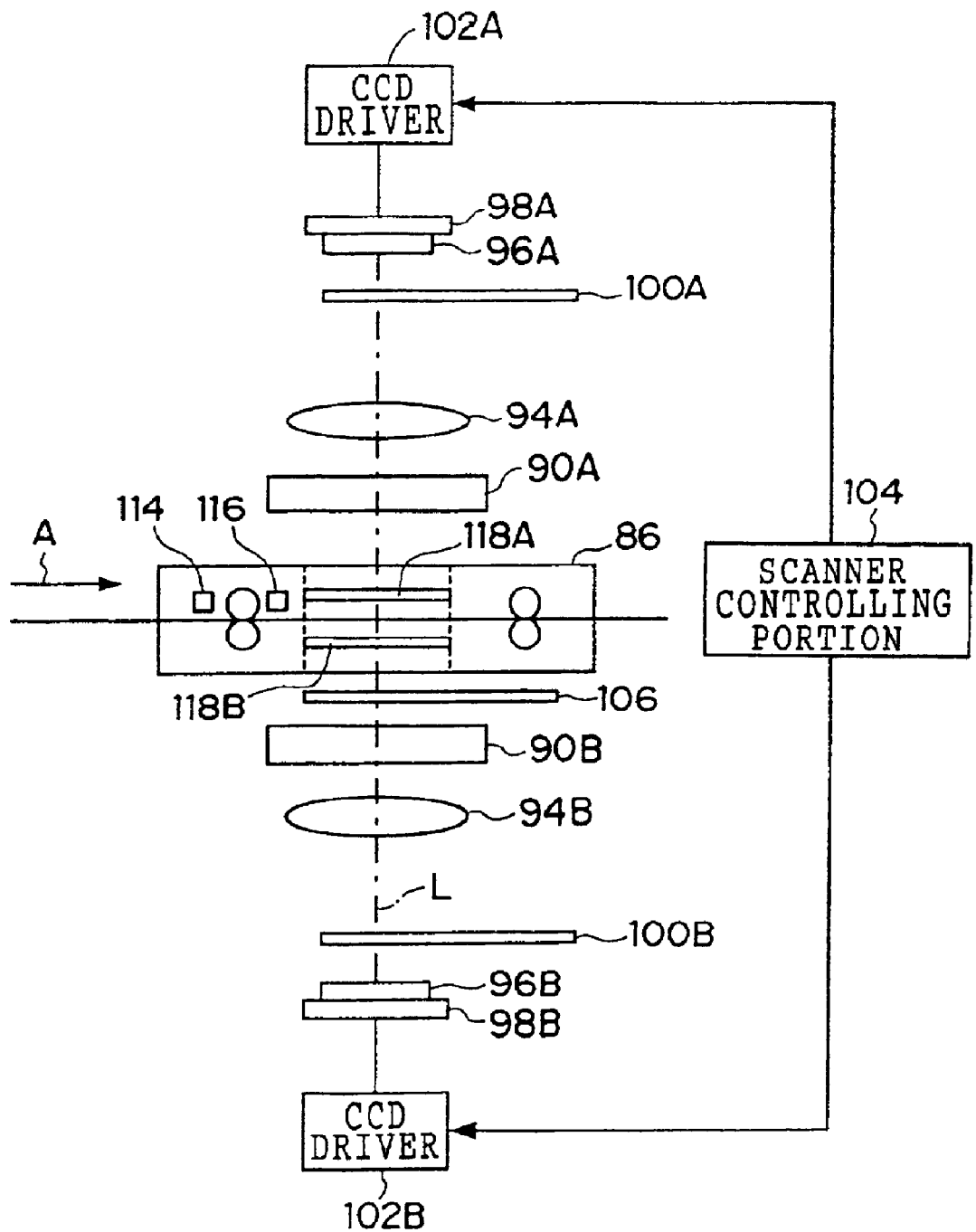
FIG. 11 is a schematic structural view of a film scanner.

The film scanner 20 is used to read images recorded on the photographic film 28 which has been subjected to the developing process by the monochromatic developing portion 16, and to output image data obtained by the reading. As shown in FIGS. 1 and 11, the film scanner 20 is provided with the film carrier 86.

An illuminating unit 90A, which is structured by disposing LEDs 88 in a ring shape as shown in FIG. 12A so as to irradiate light onto the photographic film 28, is disposed above the film carrier 86. The light emitted from the illuminating unit 90A is light having a wavelength in an infrared region (a central wavelength of about 950 nm) shown in FIG. 13, i.e., IR light. The illuminating unit 90 A is driven by an LED driver 92.

Figure 15:
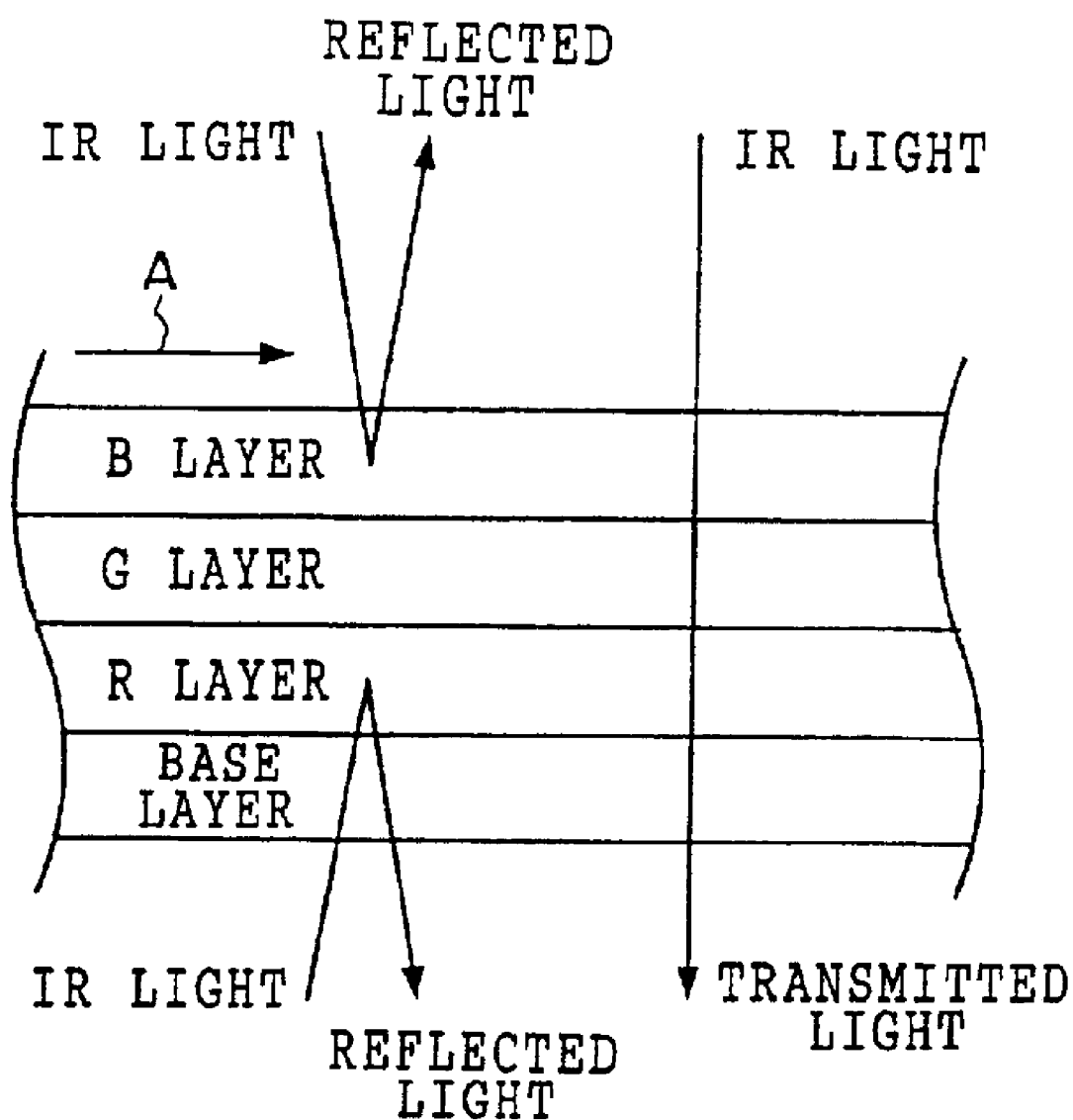
FIG. 15 is a view for describing image reading by using IR light.

As shown in FIGS. 11 and 15, a focusing lens 94A which focuses light reflected by the B layer of the photographic film 28, and an area CCD 96A which detects the light reflected by the B layer of the photographic film 28, are sequentially disposed above the illuminating unit 90A along an optical axis L. The area CCD 96A is a monochromatic CCD in which a large number of CCD cells (photoelectric conversion cells) each having sensitivity for the infrared region are arranged in a matrix form, and is disposed so that a light receiving surface thereof is substantially coincident with a focusing position of the focusing lens 94A. The area CCD 96A is disposed on a pixel shifting unit 98A. Further, a black shutter 100A is provided between the area CCD 96A and the focusing lens 94A.

The area CCD 96A is connected to the scanner controlling portion 104 via a CCD driver 102A. The scanner controlling portion 104 consists of a CPU, a ROM (for example, a ROM whose stored contents are rewritable), a RAM and an input-output port, which are connected to each other via a bus or the like. The scanner controlling portion 104 controls an operation of each portion of the film scanner 20. The CCD driver 102A generates driving signals for driving the area CCD 96A so as to control the drive of the area CCD 96A.

An illuminating unit 90B, a focusing lens 94B, an area CCD 96B disposed on a pixel shifting unit 98B, and a CCD driver 102B are sequentially disposed below the film carrier 86. These have the same structures that the above-described illuminating unit 90A, focusing lens 94A, area CCD 96A and CCD driver 102A have, respectively. However, the area CCD 96B detects both reflected light which has been reflected by the R layer of the photographic film 28 shown in FIG. 15, of IR light irradiated onto the photographic film 28 by the illuminating unit 90B, and transmitted light which has been transmitted through the photographic film 28, of IR light irradiated onto the photographic film 28 by the illuminating unit 90A. The light emitted from the illuminating unit 90B is IR light having a central wavelength of about 950 nm, which is the same as the light emitted from the illuminating unit 90A.

In a state in which a bleaching process is not being performed, an anti-halation layer using silver colloid absorbs the light for a wide wavelength region and damps incoming or outgoing light. When such an anti-halation layer is provided on the photographic film 28, the quantity of light illuminating a support surface side is preferably made different from the quantity of light illuminating an emulsion surface side, in accordance with the film type. That is, it is preferable that by identifying a layer structure of the film and a composition of the anti-halation layer; for example, the quantity of illuminating light of the illuminating unit 90B which illuminates the support surface side of the photographic film 28 is made larger than the quantity of illuminating light of the illuminating unit 90A which illuminates the emulsion surface side of the photographic film 28. A light transmittance of the anti-halation layer using silver colloid is about 20–50%. When the same quantity of light is respectively irradiated to the support surface side and the emulsion surface side, the quantity of light received by the area CCD 96B at the support surface side with respect to the quantity of light received by the area CCD 96A at the emulsion surface side is 4–25%. Therefore, the quantity of illuminating light of the illuminating unit 90B which illuminates the support surface side is preferably set so as to be, for example, two to four times as large as the quantity of illuminating light of the illuminating unit 90A which illuminates the emulsion surface side.

Figure 14A:
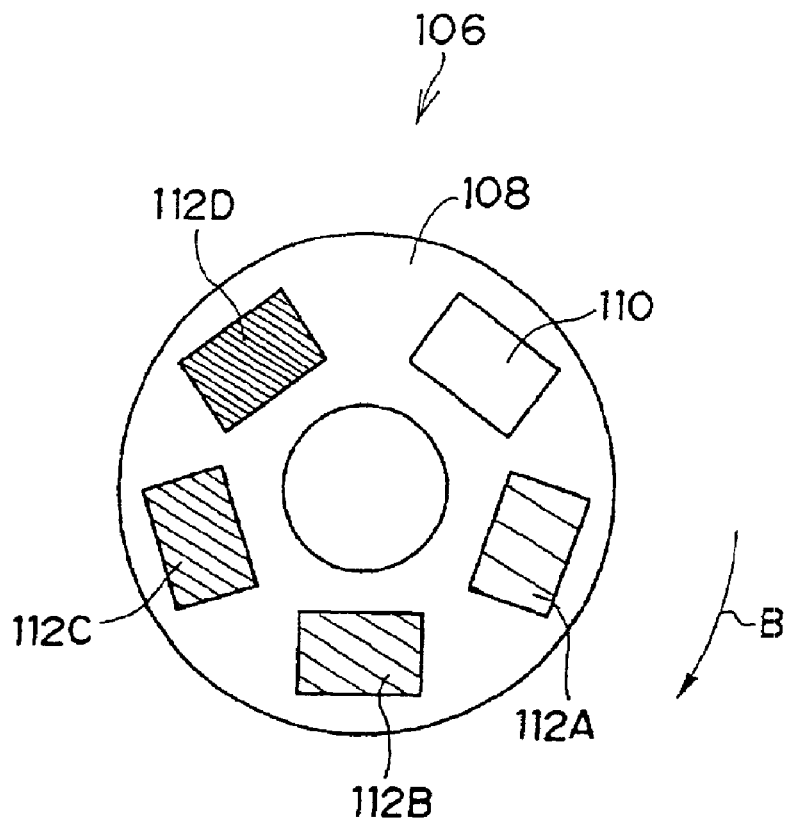
FIG. 14A is a plan view of an ND filter for correcting lightness.

An ND filter portion for correcting lightness 106 is disposed between the illuminating unit 90B and the film carrier 86. As shown in FIG. 14A, the ND filter portion for correcting lightness 106 includes a turret 108 which can rotate along the direction of arrow B. A plurality of openings (five openings in the first embodiment) are provided on the turret 108, and ND filters 112A–112D, whose transmittances are different from each other, are respectively fitted into the openings, excepting one opening 110.

The film carrier 86 conveys the photographic film 28 so that a picture center of an image (a center of an image frame) recorded on the photographic film 28 is placed at a position where the picture center is coincident with the optical axis L (reading position). The film carrier 86 is provided with a DX code reading sensor 114, a frame detecting sensor 116, reflective plates for correcting lightness 118A and 118B, and the like.

Figure 14B:
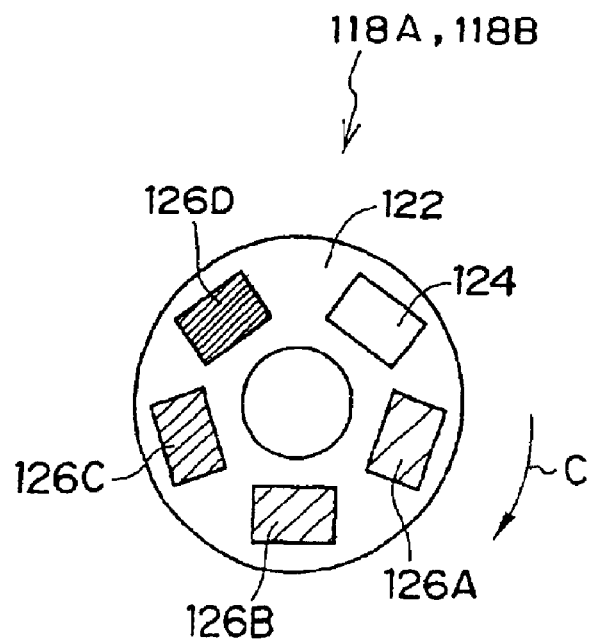
FIG. 14B is a plan view of a reflective plate for correcting lightness.

The DX code reading sensor 114 reads a DX code 120, which has been optically recorded on a 135 size photographic film 28 shown in FIG. 16. In the same manner as in the perforation detecting sensor 13, the frame detecting sensor 116 is structured so that a light emitting element and a light receiving element are disposed opposite to each other, and detects positions of frame images of the photographic film 28 by detecting perforations. Accordingly, the picture center of the image is placed at the position where the picture center is coincident with the optical axis L. The reflective plates for correcting lightness 118A and 118B are disposed opposite to each other with the photographic film 28 therebetween. As shown in FIG. 14B, each of the reflective plates for correcting lightness 118A and 118B includes a turret 122 which can rotate along the direction of arrow C. A plurality of openings (five openings in the first embodiment) are provided on the turret 122, and reflective plates 126A–126D, whose reflectances are different from each other, are respectively fitted into the openings, excepting one opening 124.

The photographic film 28 is conveyed by the film carrier 86, and the picture center of the image is placed at the position where the picture center is coincident with the optical axis L (reading position). In a state in which the image is located at the reading position, the scanner controlling portion 104 rotatively drives the turrets 122 and 108 so that the openings 124 of the reflective plates for correcting lightness 118A and 118B and the opening 110 of the ND filter portion for correcting lightness 106 are positioned on the optical axis L, and sets charge accumulation times t1 and t2 of the area CCDs 96A and 96B at the CCD drivers 102A and 102B, respectively, in accordance with predetermined reading conditions.

Accordingly, when the illuminating unit 90A is lit by the scanner controlling portion 104 as shown in FIG. 17(E), IR light is irradiated at the B layer side of the photographic film 28, the light reflected by the B layer of the photographic film 28 is detected (specifically, charges which have been photoelectrically converted are accumulated) by the area CCD 96A as shown in FIG. 17(A), and signals representing quantity of the reflected light are output from the area CCD 96A as shown in FIG. 17(B).

Simultaneously, light transmitted through the photographic film 28 is detected by the area CCD 96B as shown in FIG. 17(C), and signals representing quantity of the transmitted light are output from the area CCD 96B as shown in FIG. 17(D).

When the detection of transmitted light and the light reflected by the B layer has been completed, the illuminating unit 90B is lit by the scanner controlling portion 104 as shown in FIG. 17(F), IR light is irradiated at the support side of the photographic film 28, light reflected by the R layer of the photographic film 28 is detected by the area CCD 96B as shown in FIG. 17(C), and signals representing quantity of the reflected light are output from the area CCD 96B as shown in FIG. 17(D).

The quantity of light and lighting times t4 and t5 of the light irradiated by the illuminating units 90A and 90B, and the charge accumulation times t1, t2 and t3 by the area CCDs 96A and 96B are set by setup computations carried out by the controlling portion 140, which will be described later.

In a case of an APS film, developer is sequentially applied for each frame at the developing portion 16, and thereafter, each frame is stopped at the reading position of the film carrier 86 so as to read the image. On the other hand, in a case of a 135 size film, developer is applied so that a portion of the film is coated by the developer twice, and portions of adjacent reading ranges which are read are overlapped, and thus, when reading of one reading range has been completed, the photographic film 28 is conveyed by the film carrier 86 in the opposite direction, in order to apply developer for the next application range. Further, in this case of a 135 size film, the buffer portion 18 is preferably omitted in order to reduce a distance between the developing portion 16 and the reading portion.

The quantity of light reflected by the B layer varies in accordance with the quantity of developed silver contained in the B layer (blue photosensitive layer), i.e., the quantity of silver image in the B layer. Therefore, photoelectrically converting the light reflected by the B layer in the monochromatic development corresponds to reading image information of a yellow-dye image which is obtained when color development is performed. Similarly, photoelectrically converting the light reflected by the R layer (red photosensitive layer) in the monochromatic development corresponds to reading image information of a cyan-dye image which is obtained when color development is performed. Further, photoelectrically converting the transmitted light in this case corresponds to reading image information of an image, in which the yellow-dye image, a magenta-dye image in the green photosensitive layer, and the cyan-dye image are mixed, and which is obtained when color development is performed.

When the photographic film 28 is an APS film, as shown in FIG. 20A, developer is applied for a range which is slightly wider than a frame image, and thus, the image is read within a range which is slightly narrower than the developer applied range. When the photographic film 28 is a 135 size photographic film, as shown in FIG. 20B, a position of an image cannot be specified, and thus, the image is read within a range which is wider than the developer applied range. In this case, an overlapped range is read. However, each image can be obtained by carrying out an image processing.

The image reading by the area CCDs 96A and 96B may be performed a number of times in accordance with a state of a silver image. For example, in a state in which an image is located at the reading position, the illuminating units 90A and 90B are alternately lit at predetermined intervals, and the one image is read a number of times (three times in this embodiment) with predetermined reading timing, e.g., 10 seconds after, 20 seconds after and 40 seconds after the start of the developing process.

A silver density in a silver image increases in accordance with light exposure. When the silver density is extremely low, sometimes the image cannot be read, and on the other hand, when the silver density is extremely high, the image is difficult to read. Accordingly, a predetermined weighting factor is applied to a plurality of image data and a composite image is formed. For example, the one silver image is read a number of times as described above, and then, image data read after development has been proceeded much is used for low silver density portions, and data read at the beginning of development is used for high silver density portions. As a result, a satisfactory image with a high SN-ratio and in a wider dynamic range can be obtained, as compared with when an image is formed by using data obtained in one reading. The read image data may be recorded on a recording medium such as a floppy disk such that the recording medium is returned to a user. In this case, it is also possible that, when the image recorded on the recording medium is printed, the image data is read by a driver 24A so as to be displayed on a monitor 24C, and the weighting factor is applied by operating a keyboard 24B so as to form one composite image data.

On the basis of information read at the magnetic information reading portion 12, the reading timing and the number of times of reading by the area CCDs 96A and 96B are set for the CCD drivers 102A and 102B by setup computations carried out by the controlling portion 140 or the like, which will be described later.

In the first embodiment, the image reading is performed at one position. However, it is also possible that, a plurality of pairs of upper and lower area CCDs are serially disposed at predetermined intervals along the conveying path of the photographic film 28, and the conveying speed is changed so that the image reading is performed a number of times with a predetermined reading timing. Further, in the first embodiment, the area CCDs which are area sensors are used as sensors. However, line sensors may be used in place of the area CCDs. When line sensors are used, it is possible that, a plurality of line sensors are serially disposed at predetermined intervals along the conveying path of the photographic film 28, and the conveying speed is changed so that the image reading is performed a number of times with a predetermined reading timing.

The area CCD 96A is disposed on the pixel shifting unit 98A as shown in FIG. 18, and piezo elements driven by a piezo driver 99 are connected to the pixel shifting unit 98A. The piezo elements are oscillated by the piezo driver 99 in each of X and Y directions in FIG. 18, such that the pixel shifting unit 98A, i.e., the area CCD 96A can be shifted in the X and Y directions. Accordingly, for example, by that an image is read when the area CCD 96A is positioned at an original position and the area CCD 96A is sequentially moved by half pixels in the X and Y directions, the image can be read with four-fold resolution. The area CCD 96B also has the same structure.

As shown in FIG. 1, signals output from the area CCDs 96A and 96B are respectively amplified by amplifier circuits 128A and 128B, the amplified signals are respectively converted into digital data representing quantity of the reflected light by A/D converters 130A and 130B, and the digital data are respectively input to correlation dual sampling circuits (CDSs) 132A and 132B. The CDSs 132A and 132B sample feed-through data representing levels of feed-through signals and pixel data representing levels of signals for each pixel, subtract the feed-through data from the pixel data for each pixel, and sequentially output the results (data accurately corresponding to quantity of accumulated charge for each CCD cell) to the image processing device 22 as image data.

The image data output from the CDSs 132A and 132B are respectively input to lightness-darkness correcting portions 134A and 134B. At the lightness-darkness correcting portions 134A and 134B, lightness-darkness correction is performed based on predetermined darkness correcting data and lightness correcting data.

The lightness-darkness correcting portion 134A performs darkness correction by storing data, which has been input to the lightness-darkness correcting portion 134A in a state in which the side of the area CCD 96A to which light is radiated is shielded by the black shutter 100A (data representing a darkness output level for each cell of the area CCD 96A), for each cell in an unillustrated memory as darkness correcting data, and by subtracting the darkness output level for the cell from input image data, for each pixel. The darkness correcting data is set, for example, at the time of start-up inspection of the apparatus, every predetermined time and at every scanning; and is desirably set with a frequency in which variation of the darkness output levels can be corrected. The lightness-darkness correcting portion 134B can also perform the darkness correction in the same manner as in the above description.

When lightness correction is performed for image data of an image recorded on the photographic film 28 which has been subjected to normal color development by the lightness-darkness correcting portion 134A, initially, reflected light is read by the area CCD 96A by using a high-reflectance object such as a white plate. A gain is then determined for each cell on the basis of input data (variation of the density for each pixel, which is represented by the input data, results from variation of the photoelectric conversion property for each cell and from non-uniformity of the light source), and the gain is stored in the unillustrated memory as lightness correcting data. Then, the input image data of a frame image to be read is corrected for each pixel in accordance with the gain determined for each cell. The lightness-darkness correcting portion 134B can also perform the lightness correction in the same manner as in the above description. When transmitted light from the illuminating unit 90A is read and the lightness correction is performed, the lightness correction is performed in a state in which all the light from the illuminating unit 90A is transmitted.

However, when the lightness correction is performed for image data of an image recorded on the photographic film 28 which has been subjected to monochromatic development, if the white plate is used, or the lightness correction is performed in the state in which all the light is transmitted, it is too light when compared with a density of the image recorded on the photographic film 28, and thus, the lightness correction cannot be suitably performed. Therefore, it is preferable that a density of an unexposed portion of the photographic film 28 is set as a reference density for the lightness correction, and the lightness correction is performed so that a reflective plate or a filter having a density which is close to the reference density is positioned on the optical axis L. Accordingly, the lightness correction can be suitably performed for the photographic film 28 which has been subjected to monochromatic development. The reference density for the lightness correction is selected by setup computations carried out by the controlling portion 140, which will be described later.

Further, the lightness correction may be performed so that the unexposed portion of the photographic film 28 is positioned on the optical axis L. Accordingly, the ND filter portion for correcting lightness 106 and the reflective plates for correcting lightness 118A and 118B are not required, and thus, cost can be saved. In this case, the charge accumulation time and the quantity of light are set so that a saturation point (lightest point in a state in which linearity is kept) of the area CCDs 96A and 96B substantially corresponds to when the unexposed portion is read, and an average obtained when the unexposed portion is read a number of times in this state is stored in the unillustrated memory as lightness correcting data.

When the reading is performed with a high SN-ratio, the charge accumulation time and the quantity of light may be set by pre-scanning each frame and using the lightest point of the frame. Alternatively, when the charge accumulation time and the quantity of light are set based on the reading data of the unexposed portion, if it is determined by a first scanning that the photographic film is an over-exposed negative, the scanning may be performed again with lighter conditions (longer accumulation time and increased quantity of light).

The image data, which has been subjected to the lightness-darkness correcting process at the lightness-darkness correcting portions 134A and 134B, are respectively output to the image processing device 22.

Reflected images and a transmitted image which have been read can be made into one composite image by extracting perforations, a DX code or an FNS code provided on the photographic film 28 as a property quantity, and by aligning image data read at the area CCD 96A with image data read at the area CCD 96B on the basis of the extracted perforations, the DX codes or the FNS codes so that the property quantities are coincident with each other. The alignment may be performed on the basis of a property quantity of the image such as a frame or an edge in the image.

Further, it is also possible that, a reference chart and a reference mark provided at the film carrier 86 are simultaneously read by the area CCDs 96A and 96B; the quantity at which a center of the image is displaced from a center of the optical axis when the image is read by each area CCD is calculated so as to obtain a correction quantity in advance; and the alignment is performed in accordance with the obtained correction quantity. As the correction quantity is a value characteristic to each area CCD, the correction quantity is obtained at the time of setup.

As shown in FIG. 1, the image processing device 22 includes a frame memory 136, an image processing portion 138 and the controlling portion 140. The frame memory 136 has a capacity which can store image data for each frame image, and image data input from the film scanner 20 is stored in the frame memory 136 at every image reading. The image data input to the frame memory 136 is subjected to an image processing by the image processing portion 138.

The image processing portion 138 performs various image processings in accordance with processing conditions which have been determined for each image and notified by the controlling portion 140.

The controlling portion 140 consists of a CPU 142, a ROM 144 (for example, a ROM whose stored contents are rewritable), a RAM 146, an input-output port (I/O) 148, a hard-disk 150, a keyboard 152, a mouse 154 and a monitor 156, which are connected to each other via a bus. The CPU 142 of the controlling portion 140 computes (does setup computations of) parameters for the various image processings performed at the image processing portion 138, based on the reading data of the reference exposing portion 14, which has been input from the frame memory 136; and outputs the parameters to the image processing portion 138. The computation is performed in the following manner.

Transfer characteristic f1 for transferring from a reflection density of R to a transmittance density of R is obtained from reading data of reflected light in an R single-color exposed area of a mixed-color reference exposed portion 32 and from reading data of transmitted light therein shown in FIG. 6. As described above, the light exposure in each exposed area increases gradually from the upstream side in the photographic film 28 conveying direction toward the downstream side therein, and thus, data in the each exposed area is obtained sequentially from a low density side to a high density side. Accordingly, the transfer characteristic f1 can obtain a transfer curve for transferring from the reflection density of R to the transmittance density of R, by, for example, computing a value, in which the reading data of transmitted light is divided by the reading data of reflected light, for each density area. When the reflection density of R is $D_{HR}$, and the transmittance density of R is $D_{TR}$, $D_{TR}=f1(D_{HR})$.

Similarly, the CPU 142 obtains transfer characteristic f2 for transferring from a reflection density of B to a transmittance density of B from reading data of reflected light in a B single-color exposed area of the reference exposed portion 32 and from reading data of transmitted light therein. When the reflection density of B is $D_{HB}$, and the transmittance density of B is $D_{TB}$, $D_{TB}=f2(D_{HB})$.

As shown in FIG. 19, the controlling portion 140 outputs the obtained data of the transfer characteristics f1 and f2 to an LUT (lookup table) 158 of the image processing portion 138. The LUT 158 performs a log-conversion for each input reading data of an R image and a B image so as to convert them into reflection density data, and converts the converted reflection density data into transmittance density data on the basis of the transfer characteristics f1 and f2. The reason why the transfer characteristics are obtained so as to convert the reflection density into the transmittance density is that, for example, light passes through a layer twice in an intermediate density area such that the reflection density is about twice as high as the transmittance density, and the density is saturated in a high density area, therefore, a gray balance or the like cannot be suitably corrected when the reflection reading and the transmittance reading are mixed, because the reflection density and the transmittance density have a non-linear relationship.

On the other hand, transmittance reading data of the G layer, $D_{TG}$ is included in total transmittance density data of the R, G and B layers, and thus, when total transmittance reading data of the R, G and B layers is $D_{TRGB}$, $D_{TG}=D_{TRGB}-D_{TR}-D_{TB}$. This computation is performed by an MTX (matrix) circuit 160.

Assuming that there is no color mixture, a value of reflection density of the R layer in a G single-color exposed area, which has been read from the base side, and a value of reflection density of the B layer therein, which has been read from the emulsion surface side, are zero. This is because it can be considered that, there is no developed silver at the R layer and the B layer in the G single-color exposed area, and thus, at the R layer and the B layer, reflection does not occur at all. However, the reflection reading data of the R layer and the B layer is affected by the lower layer (G layer in the first embodiment) such that color mixture is caused, and this results in a turbid color reproduction. Similarly, assuming that there is no color mixture, values of reflection density of the B layer in the R single-color exposed area and transmittance density of the G layer therein, and values of transmittance density of the R layer and that of the G layer in the B single-color exposed area, are zero. However, in practice, each layer is affected by another layer as described above, such that color mixture is caused.

Accordingly, transmittance density of each layer in each single-color exposed area is obtained, and the effect of the color mixture is thereby eliminated as described below. First, a color mixture factor aij representing a color mixture degree of color j in color i is computed, i, j=1, 2, 3, wherein 1 is R, 2 is G, and 3 is B, respectively.

When transmittance density data of R, G and B without color mixture is R, G and B, transmittance density data of R, G and B with color mixture is R', G' and B', which are shown by the following formula (1).

$$R'=R+a12\cdot G+a13\cdot B$$
$$G'=a21\cdot R+G+a23\cdot B$$
$$B'=a31\cdot R+a32\cdot G+B \quad (1)$$

$$\begin{pmatrix} R' \\ G' \\ B' \end{pmatrix} = \begin{pmatrix} 1 & a12 & a13 \\ a21 & 1 & a23 \\ a31 & a32 & 1 \end{pmatrix} \begin{pmatrix} R \\ G \\ B \end{pmatrix} \quad (2)$$

In the above formulas (1) and (2), the color mixture factors a12 and a32 can be obtained from the transmittance density of the R layer in the G single-color exposed area, $D_{TR}$, and the transmittance density of the B layer therein, $D_{TB}$. Similarly, the color mixture factors a13 and a23 can be obtained from the transmittance density of the R layer in the B single-color exposed area, $D_{TR}$, and the transmittance density of the G layer therein, $D_{TG}$; and the color mixture factors a21 and a31 can be obtained from the transmittance density of the G layer in the R single-color exposed area, $D_{TG}$, and the transmittance density of the B layer therein, $D_{TB}$.

The CPU 142 calculates an inverse matrix shown in the above formula (2) consisting of the above-described color mixture factors so as to obtain color correction factors, and outputs the color correction factors to the MTX circuit 160.

The color correction factors may be obtained by exposing an arbitrary color chart onto a film in advance without performing RGB single-color exposure, and by optimizing the reading data and a color reproduction target value in a method of least squares or the like. In other words, the same object is continuously taken with the same camera by using a commercially available color negative film, so as to prepare an undeveloped film on which a plurality of (e.g., two frames of) latent images with the same pattern have been formed; and one frame is developed with monochromatic developer, and after developing, the frame is dried without bleaching, fixing or rinsing, so as to obtain a monochromatically developed film. The other frame is developed with color developer, and after developing, the frame is subjected to bleaching, fixing, rinsing and drying, so as to obtain a color developed film. The color correction factors are obtained with an image on the color developed film as the target.

The images recorded on the monochromatically developed film are read from three directions by a separately provided film scanner. In other words, light (IR light in the first embodiment) is irradiated at the emulsion layer side and the support side of the monochromatically developed film; reflected images on a photosensitive layer of the upper layer (B layer) and on a photosensitive layer of the lower layer (R layer), which correspond to the light reflected by each side, are respectively read; and a transmitted image, in which images on a photosensitive layer of the B layer, on a photosensitive layer of the R layer, and on a photosensitive layer of the intermediate layer (G layer) are composed, and which corresponds to the light transmitted through the monochromatically developed film, is read. Image data Br and Rr of the reflected images on the B layer and the R layer, and image data RGBt of the transmitted image on the RGB layer are taken, and pixel coordinates are corrected so that the three images are superimposed. In particular, as the reflected image on the R layer is reversed at the time of reading, the image is laterally reversed so that it can be superimposed. The images are superimposed by respectively determining reference points in the images, and then by rotationally transforming and moving each image in parallel so that coordinates of the reference points are coincident with each other. The data Br, Rr and RGBt, which have been taken from the film scanner and subjected to coordinate transformation so as to be superimposed, are respectively subjected to linear transformation by a converter for converting a gray scale into linear, and the transformed data are input to a regression arithmetic unit as data Br', Rr' and RGBt'.

On the other hand, the image recorded on each photosensitive layer of the color developed film is separated into three colors so as to be read as a transmitted image by a film scanner having the same sensitivity. The read data R, G and B are respectively subjected to linear transformation by a converter, and the transformed data are input to a regression arithmetic unit as data R', G' and B', which are target values.

In order to make the linearly transformed data of the three layers, Rr', RGBt' and Br', coincident with the target values R', G' and B', the regression arithmetic unit performs regression analysis and computes parameters. As the data Rr', RGBt' and Br' read from the monochromatically developed film have not been separated into color components (RGB components), the process for separating into color components is performed based on the color of the image recorded on the color developed film.

In other words, the regression arithmetic unit prepares ten parameters ak–jk (k=1, 2, 3, wherein 1 is R, 2 is G and 3 is B) for each of the three colors R, G and B as shown in the following formula (3), and obtains 3×10 matrix of parameters for converting the Rr', RGBt' and Br' into the target values R', G' and B' by statistical computation. As a result, 3×10 determinant is obtained as color correction factors.

$$\begin{pmatrix} R' \\ G' \\ B' \end{pmatrix} = \begin{pmatrix} a1 & b1 & c1 & d1 & e1 & f1 & g1 & h1 & i1 & j1 \\ a2 & b2 & c2 & d2 & e2 & f2 & g2 & h2 & i2 & j2 \\ a3 & b3 & c3 & d3 & e3 & f3 & g3 & h3 & i3 & j3 \end{pmatrix} \begin{pmatrix} Rr' \\ RGBt' \\ Br' \\ Rr'^2 \\ RGBt'^2 \\ Br'^2 \\ Rr' \cdot RGBt' \\ RGBt' \cdot Br' \\ Br' \cdot Rr' \\ 1 \end{pmatrix} \quad (3)$$

The above formula (3) is represented as follows:

$R' = a1Rr' + b1RGBt' + c1Br' + d1Rr'^2 + e1RGBt'^2 + f1Br'^2 + g1Rr' \cdot RGBt' + h1RGBt' \cdot Br' + i1Br' \cdot Rr' + j1$ $G' = a2Rr' + b2RGBt' + c2Br' + d2Rr'^2 + e2RGBt'^2 + f2Br'^2 + g2Rr' \cdot RGBt' + h2RGBt' \cdot Br' + i2Br' \cdot Rr' + j2$ $B' = a3Rr' + b3RGBt' + c3Br' + d3Rr'^2 + e3RGBt'^2 + f3Br'^2 + g3Rr' \cdot RGBt' + h3RGBt' \cdot Br' + i3Br' \cdot Rr' + j3$ The parameter matrix is 3×10 matrix in the above example. However, the matrix may be 3×3 matrix or 3×9 matrix.

The MTX circuit 160 computes each data of R, G and B without color mixture by using the color correction factors obtained in any one of the above-described methods, and outputs the data to a LUT 162. The LUT 162 performs gray balance correction and contrast correction. The CPU 142 determines parameters for performing the gray balance correction and the contrast correction.

In other words, transfer characteristic f3 is obtained from reading data of a gray exposed area in the reference exposed area 32 and from a predetermined target gray density. However, as general photography is performed by using a light source with various color temperatures, the gray balance cannot be sufficiently corrected by the reading data of the gray exposed area in the reference exposed area 32. Therefore, a light source correction factor of the photographic light source is estimated for each frame, and the estimated factors are output to the LUT 162. That is to say, the LUT 162 performs the gray balance correction with the transfer characteristic f3 as a reference for gradation transfer characteristics, and further performs gradation balance correction based on the light source correction factor. Furthermore, as contrast in the monochromatic development is different from contrast in the basic color development, contrast correction is performed for correcting the difference.

The image data, which has been subjected to the gray balance correction and the contrast correction, is scaled to a predetermined scale by a scaling portion 164, subjected to a dodging process by an automatic dodging portion 166, and subjected to a sharpness highlighting process by a sharpness highlighting portion 168. The sharpness highlighting process may be performed based on only high-frequency components by eliminating low-frequency components.

The image data, which has been subjected to the image processings in this manner, is converted into image data for displaying on the monitor 156 by a 3D (three-dimensional) LUT color transforming portion 170, converted into image data for printing on a photographic printing paper at the printer portion 24 by a 3D LUT color transforming portion 172, and output to the printer. It is also possible that the image data is recorded on a recording medium such as a floppy disk, a CD-R, a DVD-R or an MO, and thereafter, read by the printer so as to be processed at the time the image data is required.

The printer portion 24 consists of, for example, an image memory, a laser light source of R, G and B, a laser driver for controlling the operation of the laser light source, and the like (all of which are not illustrated). The image data for recording, which has been input from the image processing device 22, is temporarily stored in the image memory, thereafter read out, and used to modulate laser light of R, G and B emitted from the laser light source. The laser light emitted from the laser light source is scanned on the photographic printing paper via a polygon mirror and an fθ lens, and the photographic printing paper is exposed and an image is recorded on the photographic printing paper. The photographic printing paper, on which the image has been recorded, is sent to the processor portion 26, and subjected to each of the processings, i.e., color developing, bleach-fixing, rinsing and drying. As a result, the image recorded on the photographic printing paper is made visible.

Next, an operation of the first embodiment will be described by giving an example of a case in which an APS film is processed.

Initially, prior to a process of the photographic film 28, the above-described lightness-darkness correction is performed, and lightness correcting data and darkness correcting data are set at the unillustrated memory in the lightness-darkness correcting portions 134A and 134B. When the photographic film which has been used for photographing (APS film) 28 is conveyed in the direction of arrow A in FIG. 1, magnetic information, i.e., information regarding reading conditions, and information regarding the film type such as film sensitivity, which has been recorded on the magnetic layers 30, is read at the magnetic information reading portion 12.

Then, as shown in FIG. 6, the reference exposed area 32, which is an unexposed area provided at the front end side of the photographic film 28, is exposed by each color of R, G, B and gray, ranging from the low-density area to the high-density area, at the reference exposing portion 14. The photographic film 28, which has been exposed at the reference exposing portion 14, is monochromatically developed by the monochromatic developing portion 16. As a result, silver halide in each layer of R, G and B of the photographic film 28, which has been exposed to light due to photographing, is developed, and a silver image for each color is formed.

The photographic film 28, which has been monochromatically developed, is conveyed to the film scanner 20 via the buffer portion 18. When the reference exposed area 32 is detected by the frame detecting sensor 116, the photographic film 28 is positioned so that a central portion of the reference exposed area 32 is located on the optical axis L. Then, the scanner controlling portion 104 rotates the turrets 108 and 122 so that the opening 110 of the ND filter portion for correcting lightness 106 and the openings 124 of the reflective plates for correcting lightness 118A and 118B are respectively positioned on the optical axis L.

After that, the scanner controlling portion 104 sets the charge accumulation times t1, t2 and t3 for each of the CCD drivers 102A and 102B, and lights the illuminating units 90A and 90B for the lighting times t4 and t5 so as to irradiate IR light onto the photographic film 28. As a result, the reference exposed area 32 is read by the area CCDs 96A and 96B. In other words, light reflected by the B layer is detected by the area CCD 96A, and light reflected by the R layer and light transmitted through each layer are detected by the area CCD 96B. Detected signals are respectively amplified by the amplifier circuits 128A and 128B, the amplified signals are respectively converted into digital data by the A/D converters 130A and 130B, the digital data is output to the lightness-darkness correcting portions 134A and 134B via the CDSs 132A and 132B, and the data is subjected to a lightness-darkness correcting process by the lightness-darkness correcting portions 134A and 134B. The image data, which has been subjected to the lightness-darkness correcting process, is output to the frame memory 136 of the image processing device 22, and then, output to the controlling portion 140. At the CPU 142 of the controlling portion 140, the transfer characteristic f1 for transferring from a reflection density of R to a transmittance density of R is obtained from reading data of reflected light in the R single-color exposed area of the reference exposed portion 32 and from reading data of transmitted light therein. The transfer characteristic f2 for transferring from a reflection density of B to a transmittance density of B is obtained from reading data of reflected light in the B single-color exposed area of the reference exposed portion 32 and from reading data of transmitted light therein. Then, the transfer characteristics f1 and f2 are set at the LUT 158.

Next, the CPU 142 computes color mixture factors from the transmittance density data of each single-color exposed area, which data has been obtained from the transfer characteristics f1 and f2, calculates an inverse matrix of the matrix consisting of the color mixture factors so as to obtain color correction factors, and outputs the color correction factors to the MTX circuit 160. Then, the CPU 142 obtains the transfer characteristic f3 from reading data of the gray exposed area in the reference exposed area 32 and from the predetermined target gray density, and sets the transfer characteristic f3 at the LUT 162. In this way, parameters for performing the color correction, the gray balance correction, the contrast correction and the like are calculated based on the reference exposing data, and the calculated parameters are set at the image processing portion 138.

When the reference exposed area 32 has been completely read, the frame image 1 is positioned so as to be located on the optical axis L. The scanner controlling portion 104 sets the charge accumulation times t1, t2 and t3, reading timing and number of times of reading for each of the CCD drivers 102A and 102B, and lights the illuminating units 90A and 90B for the lighting times t4 and t5 so as to irradiate IR light onto the photographic film 28. As a result, the frame image 1 is read with the predetermined timing and the predetermined number of times, and the image data is output to the image processing device 22. Then, the image data is subjected to the image processing by the image processing portion 138 under the conditions set at the controlling portion 140. In other words, the LUT 158 performs the log-conversion for each input data of an R image and a B image, and converts the converted data into transmittance density data on the basis of the transfer characteristics f1 and f2.

Sequentially, the MTX circuit 160 performs the color correction for each input image data by using the color correction factors, and computes each data of R, G and B without color mixture. Then, the LUT 162 performs the gray balance correction and the contrast correction with the transfer characteristic f3 as a reference for gradation transfer characteristics. As required, the gray balance correction is performed further including the gradation balance correction based on the light source correction factors. The image data, which has been subjected to the gray balance correction and the contrast correction, is scaled with a predetermined magnification by the scaling portion 164, subjected to the dodging process by the automatic dodging portion 166, and subjected to the sharpness highlighting process by the sharpness highlighting portion 168.

The image data, which has been subjected to the image processings in this manner, is converted into image data for displaying on the monitor 156 by the 3D LUT color transforming portion 170, and converted into image data for printing on a photographic printing paper at the printer portion 24 by the 3D LUT color transforming portion 172. In accordance with the image data which has been subjected to the image processing, a photographic printing paper is exposed and an image is recorded on the photographic printing paper by the printer portion 24. The photographic printing paper, which is exposed and on which the image has been recorded, is sent to the processor portion 26, and subjected to each of the processings, i.e., color developing, bleach-fixing, rinsing and drying. As a result, the image recorded on the photographic printing paper is made visible. In this manner, images recorded on frame images are sequentially read, subjected to the image processing, and printed on the photographic printing papers.

In the first embodiment, the reading timing and the number of times of reading by the area CCDs 96A and 96B are set by setup computations carried out by the controlling portion 140 or the like, based on the information read at the magnetic information reading portion 12. Therefore, after clearly identifying the film as a monochromatically developed color photographic film, the reading conditions can be suitably changed, and images in wide dynamic ranges can be obtained.

Further, in the first embodiment, one silver image is read a number of times, and a predetermined weighting factor is applied to each of the image data obtained by a number of readings and one composite image data is formed, and thus, a satisfactory image in a wider dynamic range can be obtained. In other words, a user can adjust reproduction of a highlight portion and a shadow portion of an image while viewing the image, and can easily handle reorder and remake.

In the above first embodiment, an example in which both the reading timing and the number of times of reading are changed was described. However, only one of the reading timing and the number of times of reading may be changed. Only the number of times of reading in a predetermined time may be changed, for example, reading is performed twice or more times in three minutes, or only the reading timing may be changed, for example, reading is performed every ten seconds from the start of the development.

Still further, in the first embodiment, the quantity of light irradiated at each of the emulsion surface side and the support surface side of the color photosensitive material can be changed. When an anti-halation layer consisting of colloid silver is provided on the photographic film 28, the quantity of illuminating light from the illuminating unit 90A which illuminates the emulsion surface side of the photographic film 28 is made smaller than the quantity of illuminating light from the illuminating unit 90B which illuminates the support surface side of the photographic film 28. Accordingly, a large quantity of light does not need to be irradiated for one reading image, and thus, silver images can be read without damaging the photosensitive material by heat.

Furthermore, since area sensors are used as the reading sensors, light is not concentrated on one portion as compared with when line sensors are used, and silver images can be read without heat being concentrated on one portion.

Second Embodiment

Figure 21:
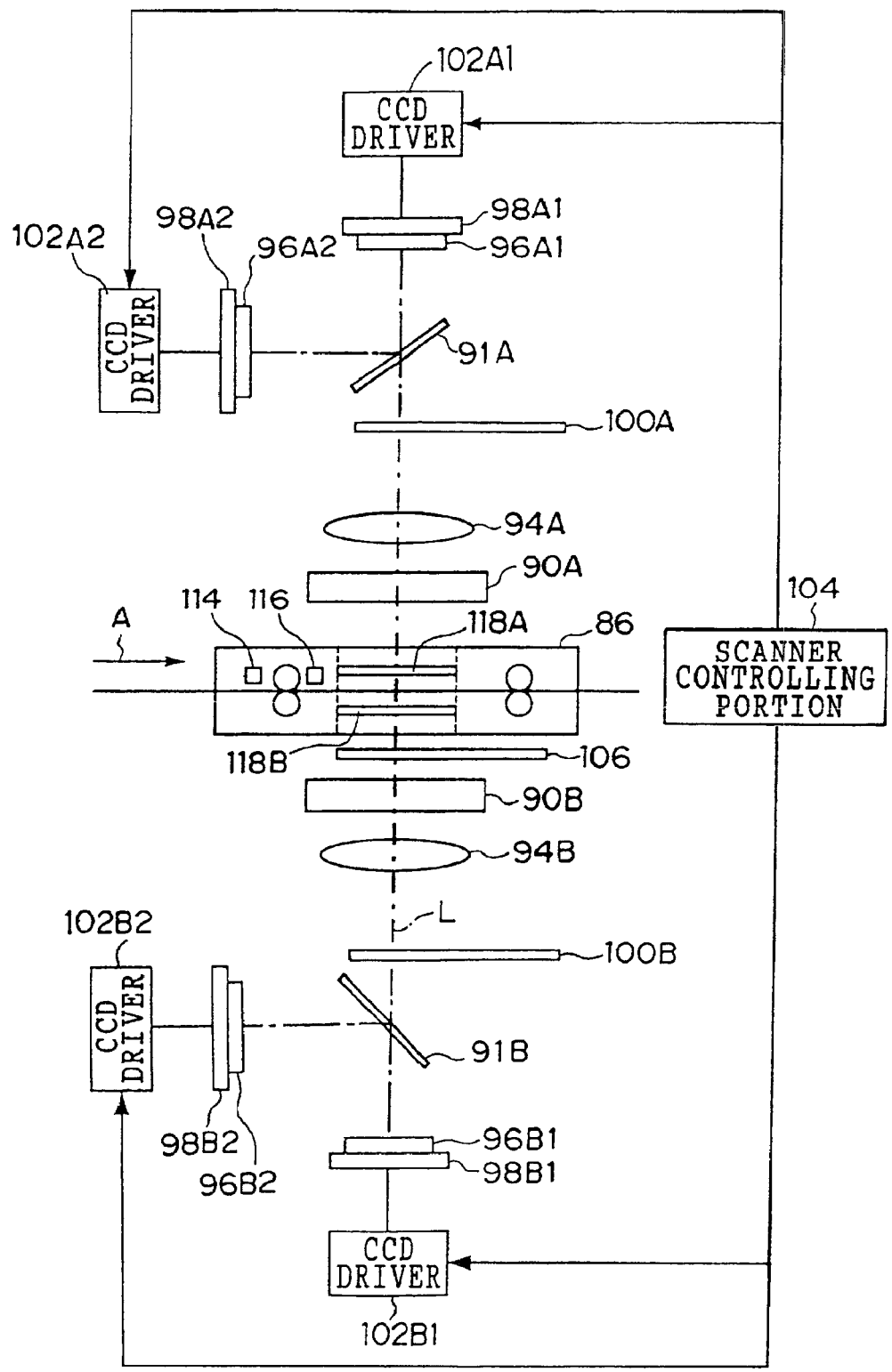
FIG. 21 is a schematic structural view showing another structure of the film scanner.

In the first embodiment, the illuminating units 90A and 90B emit light having the same wavelength (IR light having a central wavelength of about 950 nm). However, the illuminating units 90A and 90B may emit light having different wavelengths (e.g., 850 nm and 1,310 nm). In this case, reflected light and transmitted light can be simultaneously detected. Namely, as shown in FIG. 21, a half mirror 91A is disposed between the focusing lens 94A and an area corresponding to an area in which the area CCD 96A is disposed in FIG. 11, and in place of the area CCD 96A which has sensitivity for IR light having a central wavelength of about 950 nm, area CCDs 96A1 and 96A2, which have sensitivity for light of different wavelengths, are respectively disposed in directions in which light is branched by the half mirror 91A. Similarly, a half mirror 91B is disposed between the focusing lens 94B and an area corresponding to an area in which the area CCD 96B is disposed in FIG. 11, and in place of the area CCD 96B which has sensitivity for IR light having a central wavelength of about 950 nm, area CCDs 96B1 and 96B2, which have sensitivity for light of different wavelengths, are respectively disposed in directions in which light is branched by the half mirror 91B. The area CCDs 96A1, 96A2, 96B1 and 96B2 are connected to the scanner controlling portion 104 via CCD drivers 102A1, 102A2, 102B1 and 102B2, respectively. As the other structures are the same as in the first embodiment, descriptions will be omitted.

When light emitted from the illuminating unit 90A is light $\lambda_A$, and light emitted from the illuminating unit 90B is light $\lambda_B$, if the illuminating unit 90A is lit by the scanner controlling portion 104, light $\lambda_A$ is irradiated at the B layer side of the photographic film 28, light $\lambda_A$ reflected by the B layer side of the photographic film 28 is detected by the area CCD 96A1 which has sensitivity for the light $\lambda_A$, and signals representing quantity of the reflected light are output from the area CCD 96A1. Simultaneously, light $\lambda_A$ transmitted through the photographic film 28 is detected by the area CCD 96B1 which has sensitivity for the light $\lambda_A$, and signals representing quantity of the transmitted light are output from the area CCD 96B1.

On the other hand, if the illuminating unit 90B is lit by the scanner controlling portion 104, light $\lambda_B$ is irradiated at the support side of the photographic film 28, light $\lambda_B$ reflected by the R layer side of the photographic film 28 is detected by the area CCD 96B2 which has sensitivity for the light $\lambda_B$, and signals representing quantity of the reflected light are output from the area CCD 96B2. Simultaneously, light $\lambda_B$ transmitted through the photographic film 28 is detected by the area CCD 96A2 which has sensitivity for the light $\lambda_B$, and signals representing quantity of the transmitted light are output from the area CCD 96A2.

As wavelengths of reflected light and transmitted light detected at one side of the photographic film 28 are different from each other, the reflected light and the transmitted light can be simultaneously detected by simultaneously lighting the illuminating units 90A and 90B. In other words, reflected images and a transmitted image at the emulsion surface side and the support surface side of the photographic film 28 can be simultaneously read. As these images are simultaneously read, reading errors resulting from different timing of image reading for each area CCD can be prevented. Further, images may be read by alternately lighting the illuminating units 90A and 90B at predetermined intervals.

If filters transmitting only light having predetermined wavelengths are attached to the area CCDs, the area CCDs have sensitivity for light having the predetermined wavelengths. However, in FIG. 21, when dichroic mirrors are used in place of the half mirrors, the filters are not required.

In the second embodiment, the transmitted image is read by two sensors of the area CCDs 96A2 and 96B1. However, the transmitted image may be read from only one side by disposing only one of the area CCDs.

In the second embodiment, as light having different wavelengths is irradiated at the emulsion surface side and the support surface side of the color photosensitive material, reflected light and transmitted light can be simultaneously detected by simultaneously lighting the illuminating units 90A and 90B. As a result, images are read in a short time, and a large quantity of light does not need to be irradiated for a long time for one reading image, and thus, images can be read without damaging the photosensitive material by heat.

Further, in the above embodiments, an example in which silver images are formed by monochromatic development was described. However, provided that the silver images are substantially silver images, they may include dye image information, and 60% or more of image density in each layer is preferably derived from the silver images. Therefore, silver images including dye information, which are obtained by color-developing a color film, may be used.

Silver images including dye information, which are obtained when a color film is color-developed, only can be read, without reading dye images, by using infrared light. However, the dye images may be read by providing: a light source for an upper layer, which irradiates light, which has a color included in silver images in a photosensitive layer of the upper layer and a complementary color thereof, toward the photosensitive layer of the upper layer; a light source for a lower layer, which irradiates light, which has a color included in silver images in a photosensitive layer of the lower layer and a complementary color thereof, toward the photosensitive layer of the lower layer; a light source for an intermediate layer, which irradiates light, which has a color included in silver images in a photosensitive layer of the intermediate layer and a complementary color thereof, toward the photosensitive layer of the upper layer or the photosensitive layer of the lower layer; and a reading sensor, which reads image information corresponding to light reflected by the upper and lower layers of the color photographic film, and image information corresponding to light transmitted through the color photographic film.

Specifically, image information relating to a cyan-dye image and a silver image in a red photosensitive layer is obtained by detecting reflected light by using R light, image information relating to a magenta-dye image and a silver image in a green photosensitive layer is obtained by detecting transmitted light by using G light, and image information relating to a yellow-dye image and a silver image in a blue photosensitive layer is obtained by detecting reflected light by using B light.

What is claimed is:

1. An image reading apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, said apparatus comprising:

light sources, which irradiate light at an emulsion surface side and a support surface side of the color photosensitive material, respectively;

sensors, which read reflected images corresponding to lights reflected by each of the emulsion surface side and the support surface side of the color photosensitive material, and which read a transmitted image corresponding to a light transmitted through the color photosensitive material; and a reading conditions changing portion, which changes reading conditions of said sensors on the basis of information applied to the color photosensitive material;

wherein said sensors are area sensors, and said reading conditions changing portion changes the reading timing of the area sensors in a state in which the color photosensitive material is not being conveyed.

2. An image reading apparatus according to claim 1, wherein the reading conditions include at least one of reading timing and number of times of reading.

3. An image reading apparatus according to claim 1, wherein the information is one of information instructing reading in accordance with a state of the silver image, or information representing a type of the color photosensitive material.

4. An image reading apparatus according to claim 1, wherein said reading conditions changing portion changes the reading timing by changing a conveying speed of the color photosensitive material.

5. An image reading apparatus according to claim 1, further comprising a data composing portion, in which a predetermined weighting factor is applied to each of image data of one frame image, which image data is obtained by a number of readings, so as to make the weighted image data into one composite image data.

6. An image recording medium, on which image data read by an image reading apparatus, together with reading conditions under which an image relating to the image data is read, are recorded;

wherein the image reading apparatus is an apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, said apparatus comprising:

light sources, which irradiate light at an emulsion surface side and a support surface side of the color photosensitive material, respectively;

sensors, which read reflected images corresponding to lights reflected by each of the emulsion surface side and the support surface side of the color photosensitive material, and which read a transmitted image corresponding to a light transmitted through the color photosensitive material; and a reading conditions changing portion, which changes reading conditions of said sensors on the basis of information applied to the color photosensitive material;

wherein said sensors are area sensors, and said reading conditions changing portion changes the reading timing of the area sensors in a state in which the color photosensitive material is not being conveyed.

7. An image forming apparatus, which regenerates a plurality of image data for one frame image, which image data are recorded on an image recording medium, by applying a predetermined weighting factor in accordance with conditions under which the image is read, so as to form the image;

wherein the image recording medium is a medium, on which image data read by an image reading apparatus, together with reading conditions under which an image relating to the image data is read, are recorded;

wherein the image reading apparatus is an apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, said apparatus comprising:

light sources, which irradiate light at an emulsion surface side and a support surface side of the color photosensitive material, respectively;

sensors, which read reflected images corresponding to lights reflected by each of the emulsion surface side and the support surface side of the color photosensitive material, and which read a transmitted image corresponding to a light transmitted through the color photosensitive material; and a reading conditions changing portion, which changes reading conditions of said sensors on the basis of information applied to the color photosensitive material;

wherein said sensors are area sensors, and said reading conditions changing portion changes the reading timing of the area sensors in a state in which the color photosensitive material is not being conveyed.

8. An image reading apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, said apparatus comprising:

light sources, which irradiate light at an emulsion surface side and a support surface side of the color photosensitive material, respectively; and sensors, which read reflected images corresponding to lights reflected by each of the emulsion surface side and the support surface side of the color photosensitive material, and which read a transmitted image corresponding to a light transmitted through the color photosensitive material;

wherein said light sources irradiate light, having at least one of wavelength and light quantity being different from that of the other, at the emulsion surface side and the support surface side of the color photosensitive material, respectively.

9. An image reading apparatus according to claim 8, wherein quantity of light irradiated at the support surface side and quantity of light irradiated at the emulsion surface side can be changed in accordance with the type of the color photosensitive material.

10. An image reading apparatus according to claim 8, wherein said sensors are area sensors.

11. An image reading apparatus according to claim 8, further comprising a reading conditions changing portion, which changes reading conditions of said sensors on the basis of information applied to the color photosensitive material.

12. An image reading apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, said apparatus comprising:

light sources, which irradiate light at an emulsion surface side and a support surface side of the color photosensitive material, respectively; and area sensors, which read reflected images corresponding to lights reflected by each of the emulsion surface side and the support surface side of the color photosensitive material, and which read a transmitted image corresponding to a light transmitted through the color photosensitive material;

wherein said light sources irradiate light having different wavelengths, at the emulsion surface side and the support surface side of the color photosensitive material, respectively, such that the reflected images and the transmitted image are simultaneously read.

13. An image reading apparatus according to claim 12, which extracts property quantities for reflected images and a transmitted image read by said sensors, and makes the reflected images and the transmitted image into one composite image on the basis of the extracted property quantities, so that the reflected images and the transmitted image are coincident with each other.

14. An image reading apparatus according to claim 12, wherein said light sources irradiate light alternately at the emulsion surface side and the support surface side, respectively, such that the reflected image at the emulsion surface side and the reflected image at the support surface side are alternately read, and the transmitted image is read simultaneously with one of the reflected image at the emulsion surface side and the reflected image at the support surface side.

15. An image reading apparatus according to claim 12, which reads one image a number of times in accordance with a state of the silver image.

16. An image reading apparatus according to claim 12, wherein said light sources irradiate infrared light.

17. An image reading apparatus for reading an image recorded on a color photosensitive material, which has at least three types of photosensitive layers containing blue photosensitive, green photosensitive and red photosensitive silver halide emulsions on a transmissive support, and which has been processed, after image exposure, so as to generate silver images in each of the photosensitive layers, said apparatus comprising:

light sources, which irradiate light at an emulsion surface side and a support surface side of the color photosensitive material, respectively, comprising:

a first light source, which irradiates light at the emulsion surface side of the color photosensitive material; and a second light source, which irradiates light at the support surface side of the color photosensitive material;

sensors, which read reflected images corresponding to lights reflected by each of the emulsion surface side and the support surface side of the color photosensitive material, and which read a transmitted image corresponding to a light transmitted through the color photosensitive material, comprising:

a first sensor, which reads a reflected image at the emulsion surface side, which image corresponds to light reflected by the emulsion surface side of the color photosensitive material; and a second sensor, which reads a reflected image at the support surface side, which image corresponds to light reflected by the support surface side of the color photosensitive material; and a reading conditions changing portion, which changes reading conditions of said sensors on the basis of information applied to the color photosensitive material.

18. An image reading apparatus according to claim 17, wherein said second sensor reads a transmitted image which corresponds to light irradiated from said first light source and transmitted through the color photosensitive material.

19. An image reading apparatus according to claim 18, wherein said first sensor reads a transmitted image which corresponds to light irradiated from said second light source and transmitted through the color photosensitive material.

20. An image reading apparatus according to claim 17, wherein reading ranges on the color photosensitive material by said first sensor are set so that adjacent reading ranges partially overlap with each other.

21. An image reading apparatus according to claim 17, wherein reading ranges on the color photosensitive material by said second sensor are set so that adjacent reading ranges partially overlap with each other.

* * * * *